BEST AVAILABLE COPY
J. E. RANSOM.
VOTING MACHINE.
APPLICATION FILED FEB. 23, 1893.
1,067,679.
Patented July 15, 1913.
10 SHEETS—SHEET 1.
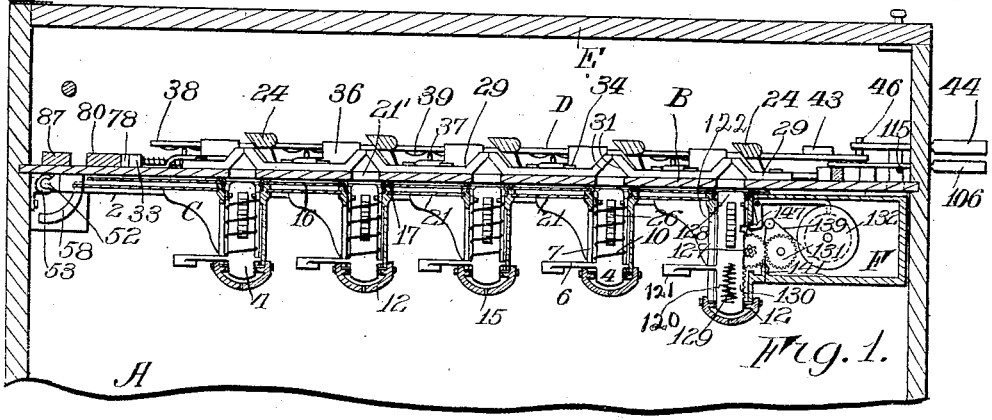
Fig. 1.
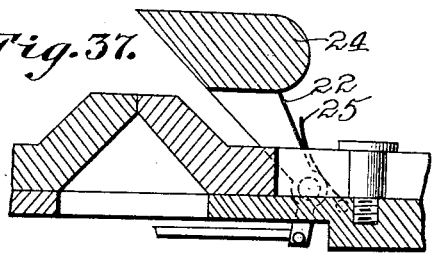
Fig. 37.
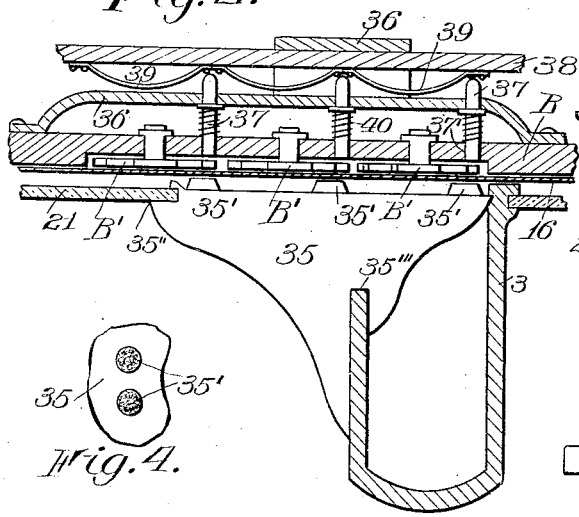
Fig. 2.
Fig. 4.
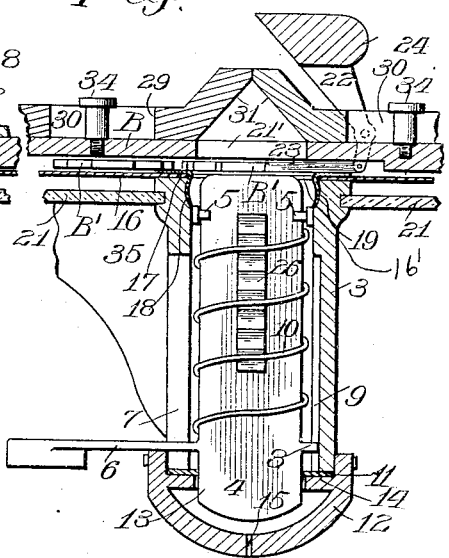
Fig. 3.
Witnesses.
Walter B. Payne
Florence E. Franck
Inventor.
John E. Ransom
by Frederick F. Church
his Attorney.
COLUMBIA PLANOGRAPH CO., WASHINGTON, D. C.

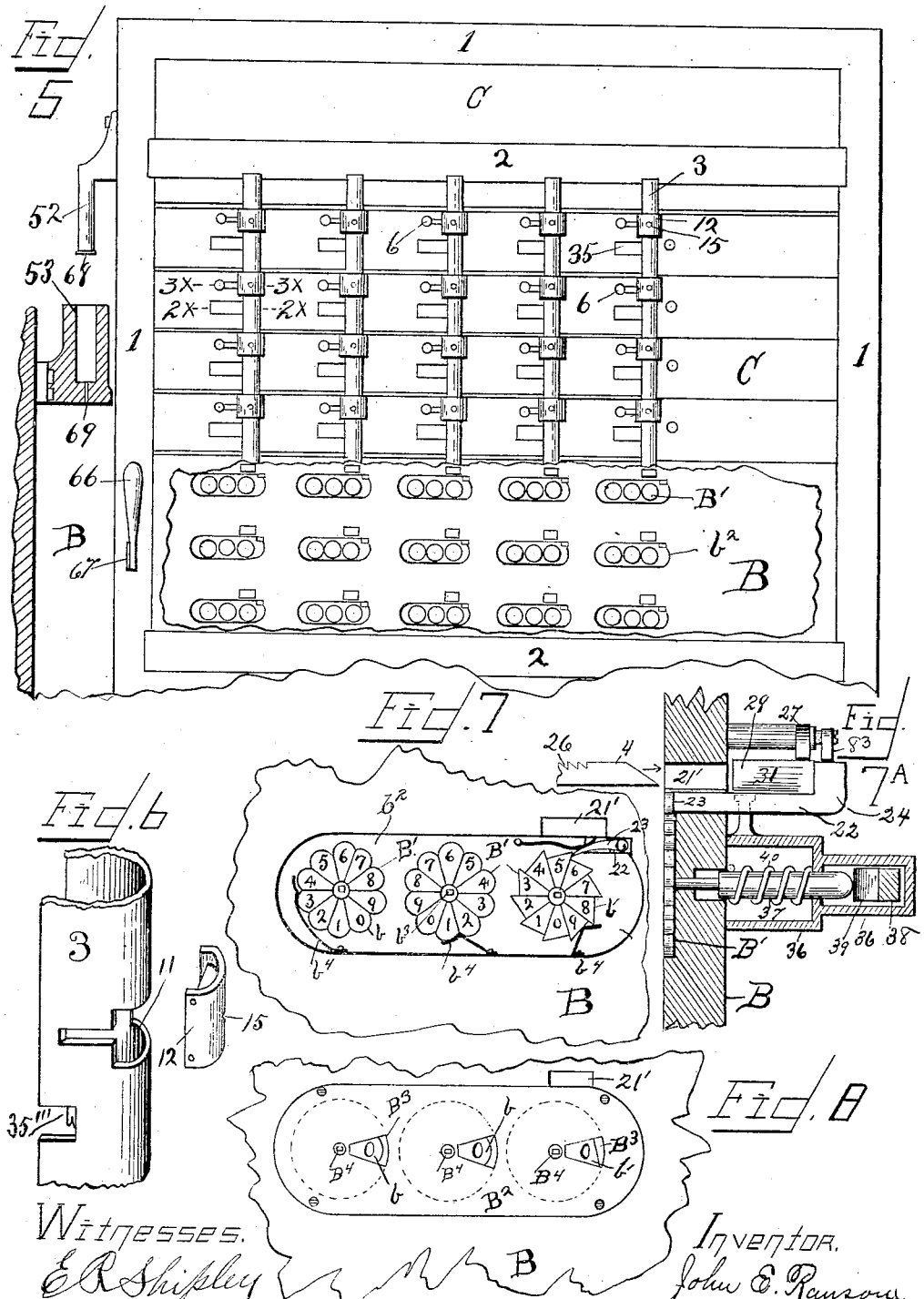

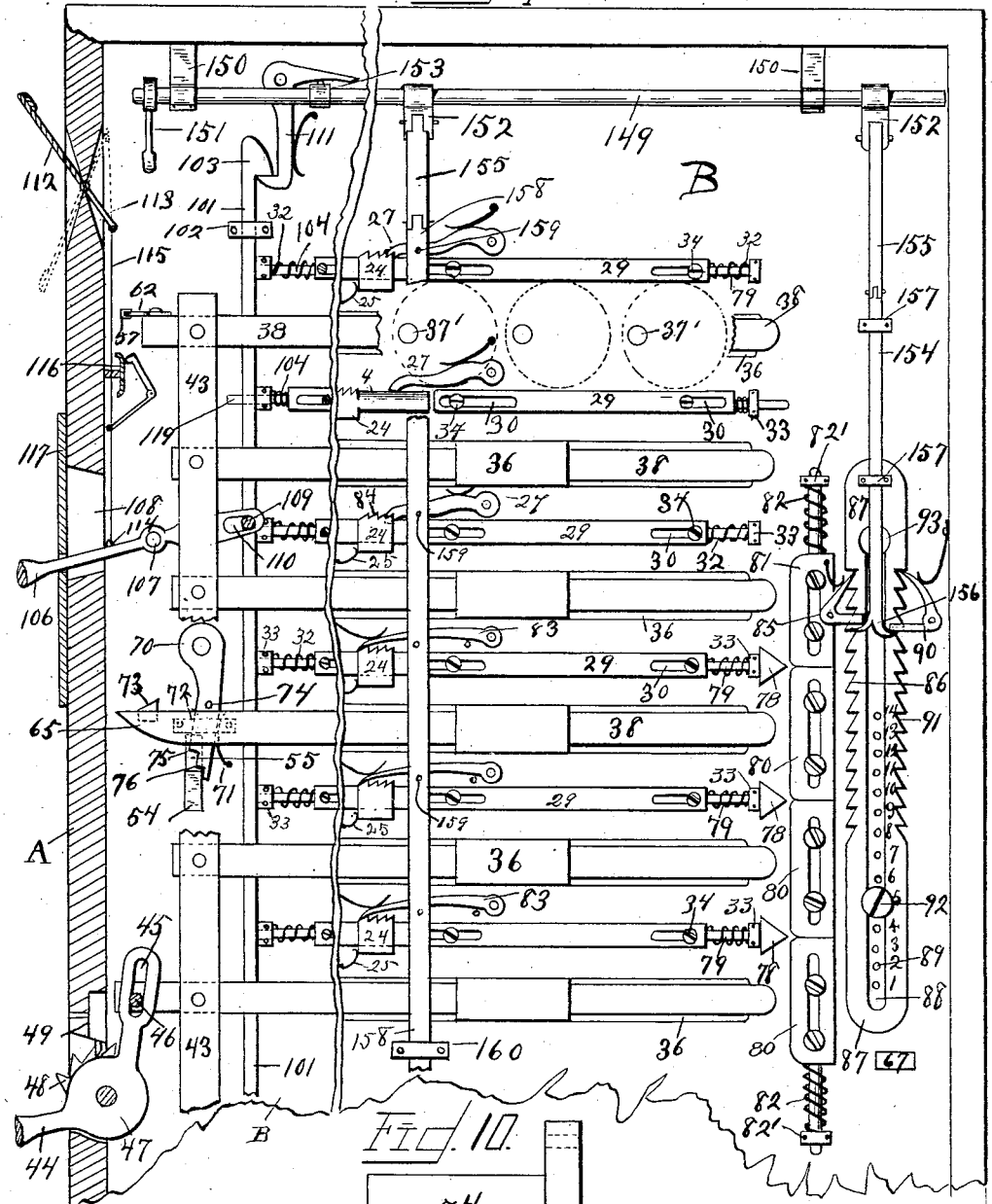

J. E. RANSOM.
VOTING MACHINE.
APPLICATION FILED FEB. 23, 1893.

1,067,679.

Patented July 15, 1913.
10 SHEETS—SHEET 4.

Fig. 11

| DEMOCRAT | REPUBLICAN | TEMPERANCE | | SCATTERING |
|---|---|---|---|---|
| For Governor 2 0 6 0 0 John Jones | For Governor 2 0 6 0 0 John Smith | For Governor 2 0 6 0 0 John Brown | | |
| For Lieut. Gov. 3 0 6 0 0 John Doe | For Lieut. Gov. 2 2 6 0 2 0 Adam Strong | For Lieut. Gov. 1 0 6 2 0 T.D.St.John | | |
| For Secy. of State 2 0 6 0 0 Richard Roe | For Secy. of State 2 0 6 0 0 John Long | For Secy. of State 2 0 6 0 0 John Good | | |

Witnesses.
E. R. Shipley.
M. J. Hunt.

Inventor:
John E. Ransom
By W. S. Boyd.
his Atty.

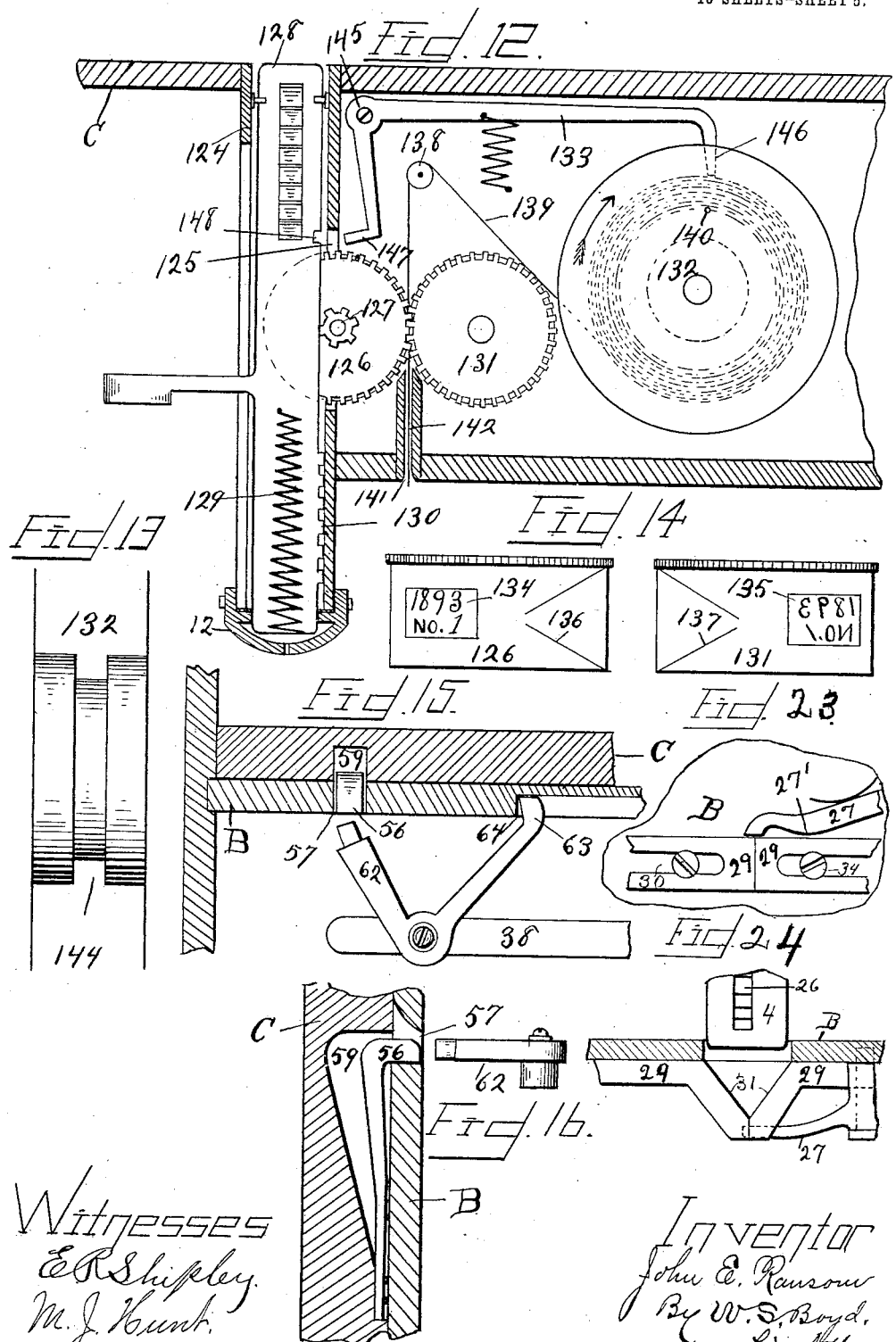

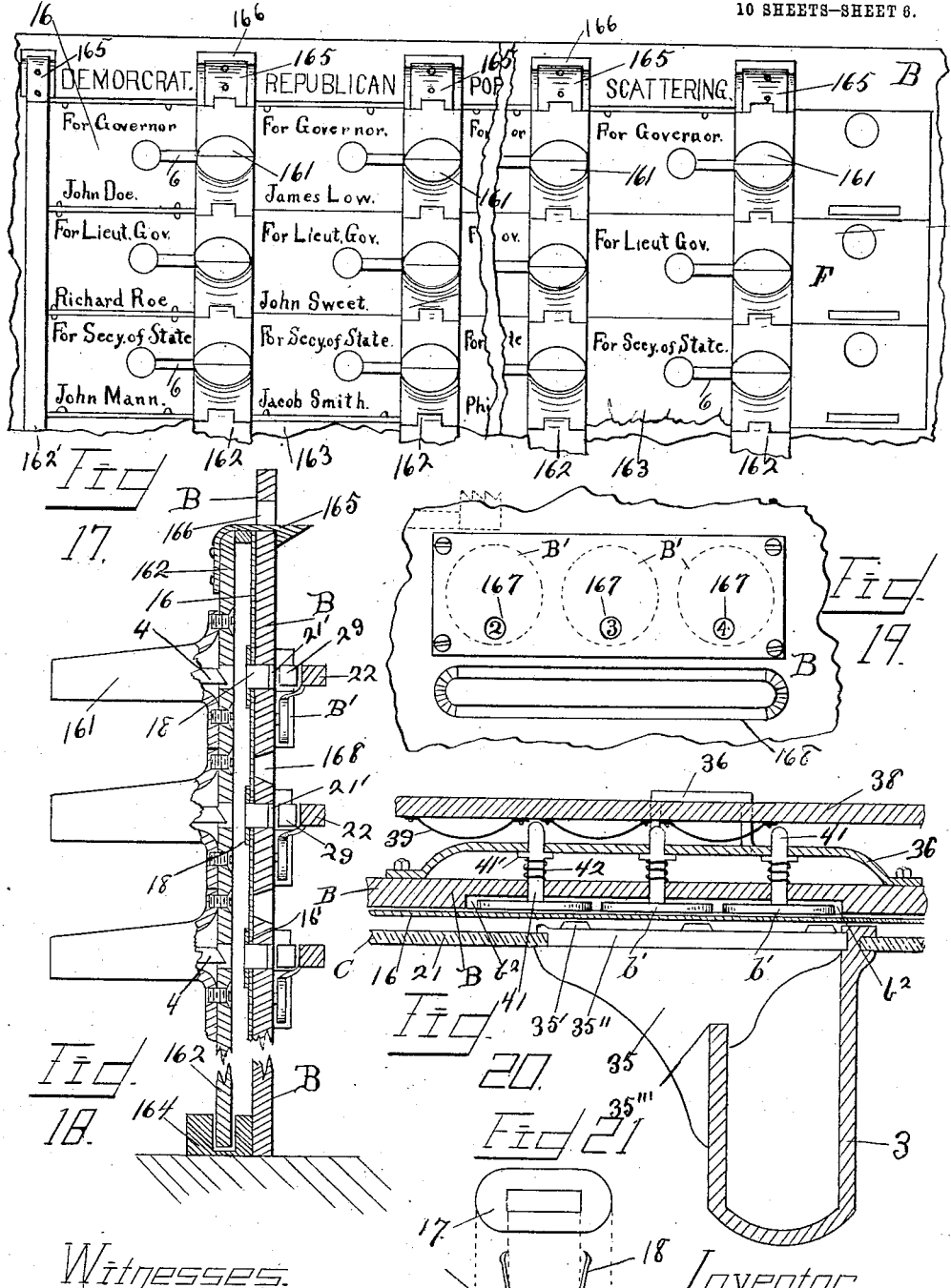

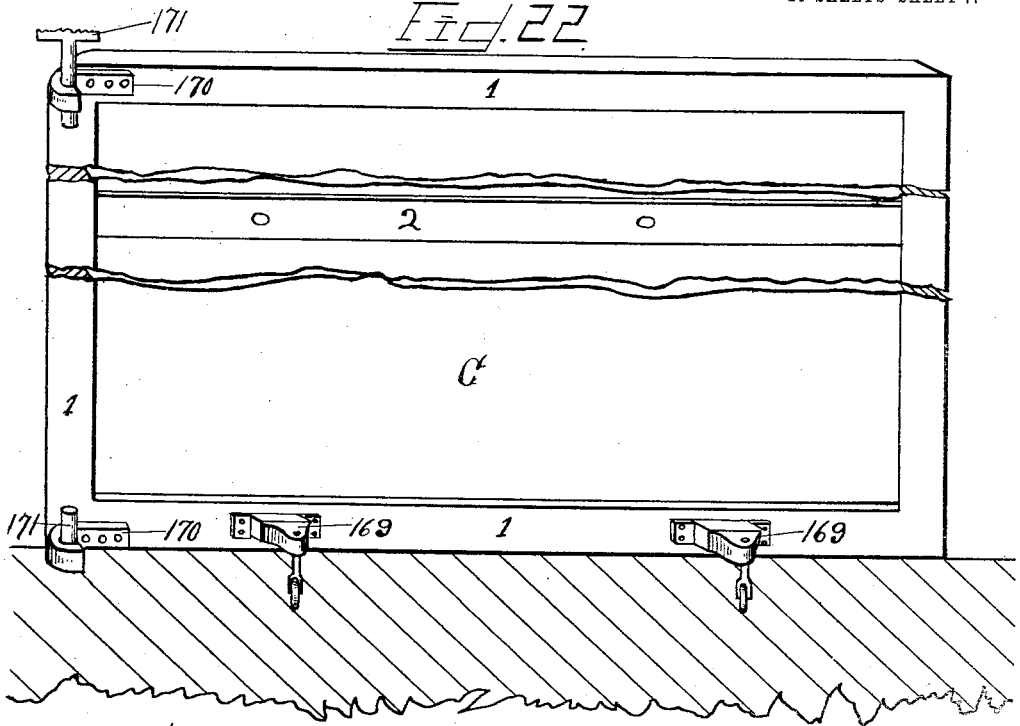
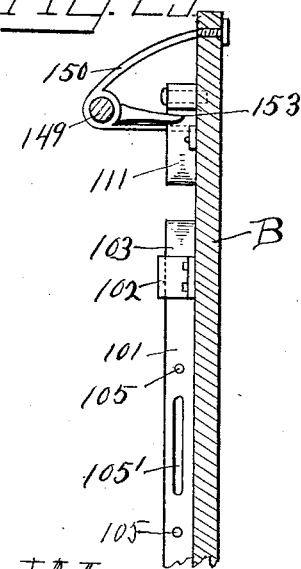
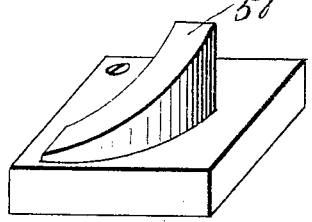

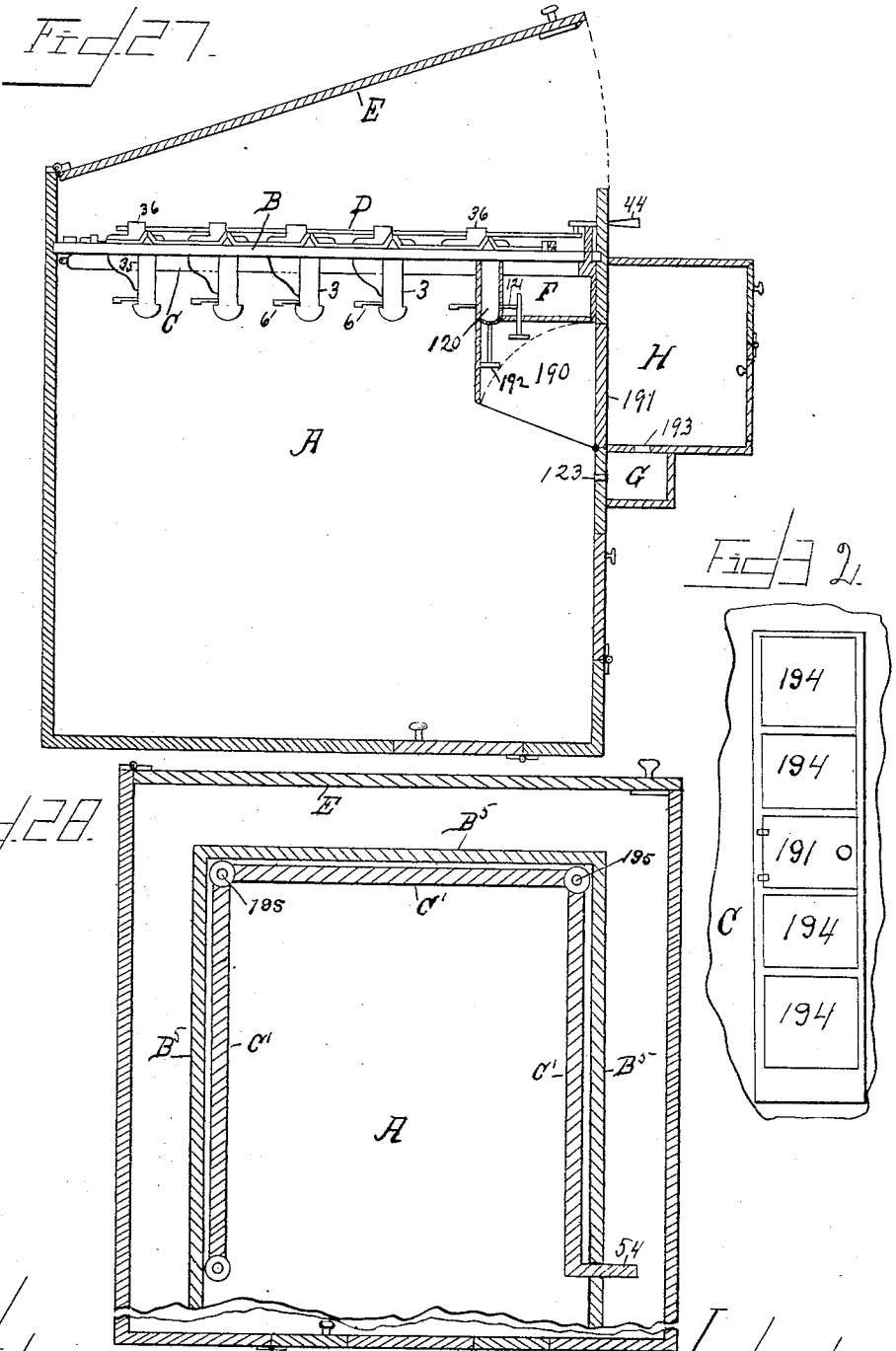

J. E. RANSOM.
VOTING MACHINE.
APPLICATION FILED FEB. 23, 1893.
1,067,679.
Patented July 15, 1913.
10 SHEETS—SHEET 9.
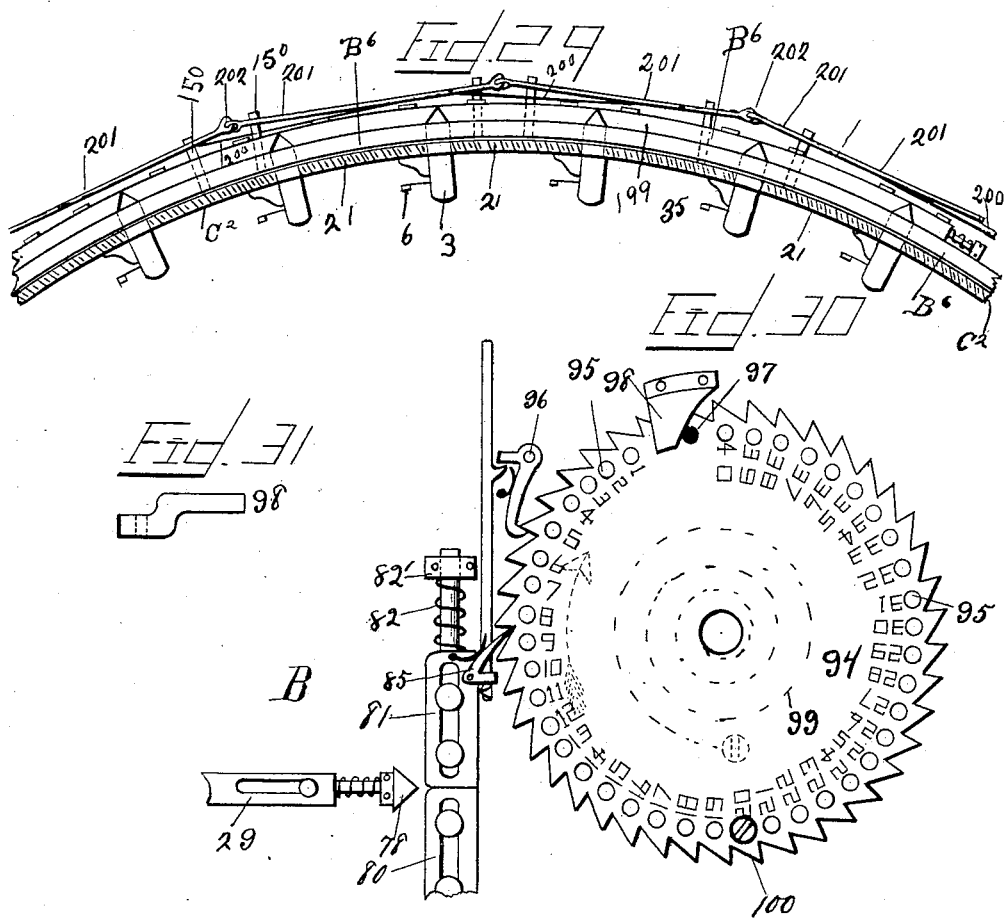

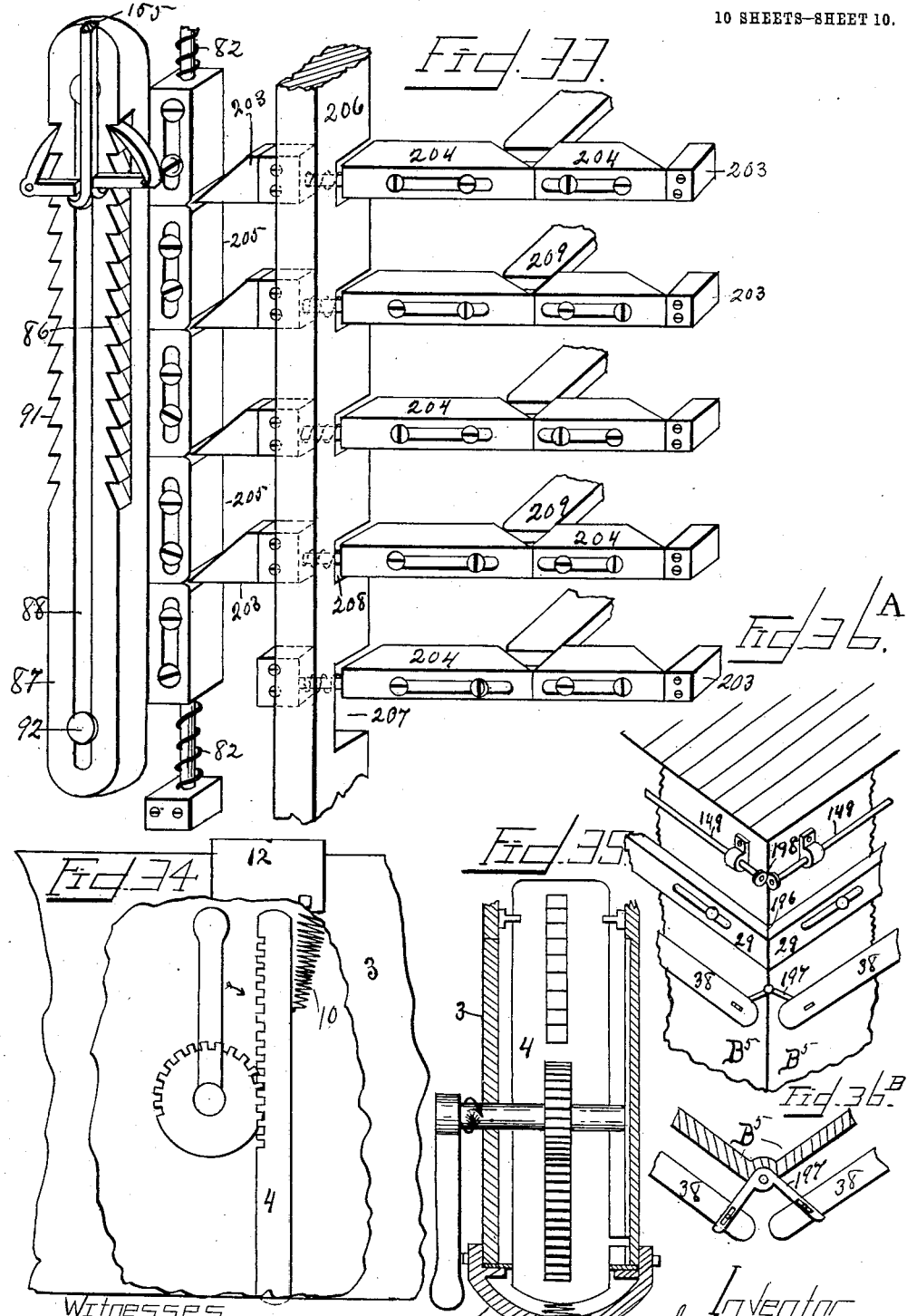

UNITED STATES PATENT OFFICE.

JOHN E. RANSOM, OF BUFFALO, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

1,067,679.  Specification of Letters Patent.  Patented July 15, 1913.

Application filed February 23, 1893. Serial No. 463,501.

*To all whom it may concern:*

Be it known that I, JOHN ELDERKIN RANSOM, citizen of the United States, residing at Buffalo, in the county of Erie and State of New York, have invented certain new and useful Improvements in Voting-Machines; and I do hereby declare the following to be a full, clear, and exact description of the invention, such as will enable others skilled in the art to which it appertains to make and use the same.

My invention relates to voting machines and has for its object to provide a mechanical Australian ballot having keys arranged thereon in office rows and party columns with ballot labels thereon bearing the names of the candidates to be voted on. In connection with the keys are counters, on which are registered the votes indicated by the keys.

Another object is to provide a printing mechanism by which is printed the total vote indicated by the counters, thus insuring correct returns.

The machine of my invention is equipped with an interlocking mechanism by which the voter is prevented from voting more keys for any office than by law he is entitled to vote.

Another object is to provide means whereby a voter may register a choice for persons not regularly in nomination called "scattering," and to permit a voter to register his choice for as many candidates for each office whether regularly nominated or scattering as he is by law entitled to vote for that office.

Another object is to provide means for voting by persons restricted to voting for candidates, or other persons of their choice, for a part of the offices to be filled, while preventing them from voting for others, for instance, women, who in some States are authorized by law to vote for candidates for school commissioner and not for candidates for other offices.

I accomplish these objects and provide safe-guards for the voter and afford restriction against errors and fraud being perpetrated against the public, by means and mechanisms as will be hereinafter more fully set forth.

Referring to the accompanying drawings in which the same reference numerals indicate corresponding parts in the different views, Figure 1 is a horizontal sectional view of a machine embodying my invention, a portion of the outer casing or booth being broken away, and some of the parts being omitted or shown only in outline. Figs. 2 and 3 are sectional views of a portion of the same taken in the lines $2^x$—$2^x$ and $3^x$—$3^x$ of Fig. 5. Fig. 4 is a detail view of the printing pads. Fig. 5 is a front view of the machine with the support of the keys and counters partly broken away. Fig. 6 is a detail view of the channel bar, with the key and spring omitted. Fig. 7 is an elevation of a registering mechanism, with the covering removed. Fig. $7^A$ is a vertical section through one of the counters. Fig. 8 is a view of one of the counters showing the covering in place and a portion of the registering wheels showing through slots in the cover. Fig. 9 is a broken view of the plate of the machine, carrying the interlocking mechanism and counters. Fig. 10 is a detail view of the latch that holds the plates B and C together. Fig. 11 is a plan view of the record receiving medium or tally sheet. Fig. 12 is a plan view partly in horizontal section of the mechanism for scattering votes for unnominated candidates. Figs. 13 and 14 are detail views of parts of the same. Figs. 15 and 16 are top and side views respectively of the support releasing mechanism shown in section. Fig. 17 is a broken elevation of the front of my machine embodying a modification of key support. Fig. 18 is a vertical transverse sectional view of the same. Fig. 19 is an elevation of a portion of the plate B provided with a counter and showing a slot below the counter. Fig. 20 is a horizontal sectional view of the counter showing modification of the means for operating the printing mechanism. Fig. 21 is a plan and edge view of the cotter for holding the tally sheet in position. Fig. 22 is a plan view partly broken away of a laterally movable support for the keys. Figs. 23 and 24 are detail views of the interlocking blocks, partly broken away. Fig. 25 is a side view of the mechanism which limits persons of limited franchise to voting on particular offices. Fig. 26 is a detail view of a cam for raising the support shown in Fig. 22 when it is moved toward the plate that supports the counters. Fig. 27 is a horizontal section of the voting machine and booth showing a separate chamber for persons of limited franchise. Fig. 28 is a horizontal section of a voting machine booth showing a folding support and plate, the operating mechanism being omitted. Fig. 29 is a horizontal transverse sectional view partly broken away showing a modified form of my voting machine, the voting and counting mechanism being mounted on curved plates. Fig. 30 is a detail of a modified form of interlocking device shown in side elevation and partly broken away. Fig. 31 is a detail view of a stop on said device. Fig. 32 is a broken plan view of a portion of one form of device for locking out persons of limited franchise. Fig. 33 is a perspective view of a modified form of a lockout bar partly broken away, for use when persons of limited franchise are voting. Figs. 34 and 35 are side and plan views of a modified form of voting key. Figs. 36$^A$ and 36$^B$ are perspective and sectional views of one corner of a multi-sided device, the figures being partly broken away. Fig. 37 is a detail view on a large scale illustrating the parts shown in the upper right hand corner of Fig. 3.

Referring to the drawings generally: A indicates a voting booth in which a vote may be cast in secrecy, provided with entrance and exit doors, (see Fig. 27) one of which doors is connected in any usual manner with the releasing mechanism; B is a plate secured transversely across and near one end of the booth and on which is mounted registering and recording and interlocking mechanisms; C is a pivoted support for the voting keys or indicators, movable toward and from the plate B; D is the means at the rear of the plate B for operating the recording mechanisms; E is the back door of the chamber or booth to which it is attached by hinges and locked with a lock. This door affords access to the mechanisms upon the reverse side of the plate B for the purpose of adjusting and repairing them; F is an attachment provided with mechanisms for enabling voters to vote for persons not nominated; G (Fig. 27) is a ballot box for the reception of votes or ballots for persons not nominated; H is a separate chamber or compartment, which, however, may be dispensed with, for enabling persons of limited privileges to cast their votes; all as will be hereinafter more fully set forth.

In the booth A the metal plate B is mounted. The frame or support C carrying the keys is pivotally secured at one side of the chamber, adjacent to the plate B, so that it can be swung away from and back to the plate B and secured thereto. The frame C is composed of the upright outer pieces 1, 1, and the intermediate or cross pieces 2, 2, secured thereto. Secured to the cross pieces at suitable distances apart, are vertical U shaped channel bars 3, 3, within which are located the keys 4, 4, for voting (see Fig. 6.) These keys 4, 4, are preferably arranged in vertical columns corresponding to the parties and in horizontal series corresponding with the offices, there being one key for each person nominated and also one voting device in each series for persons not nominated. The key consists of a flat plate 4, which fits within guides 5, 5, attached within the channel bars 3, see Fig. 6 and is provided with an operating handle 6, which projects through a slot 7, in the side of the channel. This key also has a lug or projection 8, which fits in a recess 9, opposite the slot. The handle 6 and lug 8 together with the guides 5 prevent the rotation of the key and also form bearings for the ends of the spring 10, which surrounds the key within the bar and is designed for retracting said key after it has been pushed in by pressure upon the handle. Over each key a portion of the channel is cut away as at 11, forming an opening through which the key and its retracting spring can conveniently be placed in position. Over this opening is fitted a cap 12, having an aperture 13, through which the end of the key passes and around which may be placed a leather washer 14, closely fitting the key. The outer wall of the said cap is provided with a small vent hole 15, through which the air slowly escapes as the key is retracted by the spring. This device prevents the too sudden arrest or stoppage of the key. If at any poll all of the keys provided in the machine are not to be used, those not needed may be removed from the channel bars or they may be covered in any desired manner, as with a canvas.

The spaces in the frame C are preferably covered with glass 21, secured by putting it in grooves in the channel bars. There may be a piece of glass for each name and legend or the glass may be made in strips long enough to cover any number of names, even extending from the top to the bottom of the frame; but I prefer the smaller pieces of glass. For each one of the keys 4 upon the frame C, the plate B is provided with a hole 21' for the passage of said key, and with a registering mechanism which may be of any desired form, as for instance, shown in Figs. 7 and 8, three wheels B', B', B'.

In order to prevent the voter from retracting the key and registering more votes than he is entitled to, I provide the key 4, with a series of steps or notches 26, into one of which falls a spring actuated latch 27, (Figs. 7$^a$, 9, 23, and 24) that is pivoted to the rear side of the plate B and normally rests upon adjacent abutting ends of the blocks 29, in such position that it will drop when the blocks are separated, and the end of the key will raise it when the said key is thrust in. The latch falls into the first notch after the key has advanced far enough to in turn move the blocks 29 far enough to prevent the actuation of any other key in the same series, as hereinafter set forth, and before it has operated to move any part of the registering mechanism. As the key is farther advanced the latch drops into the successive steps or notches thereon, which notches are of such length that the key must be moved a distance equal to two or more of them in order to move the lever 22, far enough to turn the register wheel one step, thus preventing duplication of the vote by working the key back and forth between the point where the latch first engages the first notch upon the key and the extreme inthrust thereof or part way therebetween.

The key is released from the detention of the latch by the operation of mechanism hereinafter described, and when it is so released the spring 10 retracts the key, and the lever 22, is retracted by the spring 25. The interlocking blocks 29 are slotted as shown at 30 and abut against each other and are arranged in series extending entirely across the plate B or so far as it is required to lock the keys, there being one row of these blocks for each office line of keys. The abutting ends of these blocks 29 are beveled as shown at 31, and the bevels are in alinement with the ends of the keys. Each block 29 at the ends of a series of blocks may be provided with a compression spring 32, bearing on the block and also upon the stop 33, attached to the plate B, said springs serving to return the blocks 29 to their normal position after the key has been retracted. The blocks 29 may be secured to the plates by means of screws 34, which are shouldered and pass through the slots 30, in the blocks 29 and hold the block against the plate without binding, or said blocks may be secured to the frame of the printing mechanism hereinafter described, in the same manner.

The extent of the longitudinal outward movement of the blocks 29 may be regulated in any desired manner, as, by so locating the inner screw of the end blocks relatively to the inner ends of the slots on said blocks that after the blocks have moved the required distance they will engage each block with its respective inner screw and be prevented from moving any farther in that direction. The retraction or inward movement of the blocks may be limited by locating the outer screws of each series relatively to the outer end of the slots in the end blocks so that they will engage each block with its respective outer screw when the abutting ends and inclines of all of the blocks in the series are in alinement with the ends of the respective keys. It will be seen that this arrangement insures the correct alinement and operation of the keys and blocks.

As above described, the machine can be used by each voter for voting once for each respective office for any one of the persons whose name is on the sheet by such voter entering the compartment A and operating one key once in each of the series.

To permit of voting by each and any voter for any two or more candidates for one office, as for presidential electors, according to his choice, I devote so many rows or series of mechanism as are needed therefor, to that purpose, making one system of all such rows or series of mechanisms. This may be done in the manner shown in Fig. 9 and which I will now describe, as follows: I provide a spear head, bevel or block 78 secured to an end block of each row or series of blocks 29, by means of a rod 79, which passes loosely through the stop block 33 and the compression spring 32. The beveled surfaces of said spear-heads 78 have a vertical inclination. Attached to the plate B by shouldered screws similar to the screws 34, I provide a series of vertically moving interlocking blocks 80, and the half block 81. The vertical blocks 80 and 81 abut against each other and have slightly rounded corners which are normally in alinement with the points of the horizontal blocks or spear-heads 78, so that when a key in any line of the system is operated, a spear-head 78 is thrust between two of the vertical blocks, which will move the vertical series of blocks 80, 81 part upward and part downward, and throw all of the other said abutting joints out of alinement with the points of the respective spear-heads 78, and thus prevent, for the time being, the operation of any other key in that entire system. The shouldered screws, by which the said vertical blocks 80, 81 are attached to the plate B as shown in Fig. 9, are so set that the said half blocks 81, which are located one at each end of the series, may move outwardly but one step, which step is little more than the lead of one of the vertical bevels of a spear-head 78, and not so much greater as to permit any further effective movement of any key before the previously actuated ballot key has been retracted. Said screws are also so set that the intermediate or whole blocks 80 may move freely the required distance each way, but the half blocks 81 at the ends can not move toward each other beyond the point where they will bring all of the abutting joints of the vertical series of blocks in alinement with the pointed ends of the spear-heads 78 of the system. Springs 82 are provided and attached to the stops 82' which in turn are attached to the plate B, which springs 82 normally hold the said half blocks 81 each jammed against its outmost screw, which will cause the abutting ends of the blocks to be held in proper alinement with the spear-heads 78 as aforesaid.

It will be seen that in the arrangement thus far described only one vote can be registered in one system by one voter. However, I can dispense with the retaining latch 27, that is intended to retain the key 4, to the end that the said key may be at once retracted by its spring when it is abandoned by the voter. To prevent the same voter registering a second vote upon the mechanism pertaining to any key, I provide a spring pressed latch 83, attached to the plate B, whose loose end normally rests upon the end or head 24 of the counter-actuating lever 22, which head may be provided with a series of steps or notches 84, see Fig. 9, with which steps or notches the said latch 83 may coöperate, step by step, as the lever is moved by the inward progress of the key. The relation of the parts is such that the lever 22 is not moved until after the key 4 has moved the blocks 29 so far as to prevent the entrance of any other key 4 between any other blocks in that series, as elsewhere described, and said relation is such that no possible return movement of the head of the lever 22, and the consequent movement of the other end of the lever will permit the pawl 23 to engage with the succeeding tooth or section of the registering wheel $b'$ before it has been released in the manner elsewhere set forth. This arrangement leaves the voter free to register upon any other mechanism in the same system and successively upon still other registers to the pre-arranged limited number. I limit the number of votes that one voter may successively register in the said system as follows: Upon one of the half blocks 81 of the vertical line of interlocking blocks I provide a spring retained angled ratchet dog 85 thereto pivotally attached, and coöperating with a ratchet 86 adjacent thereto upon the slotted vertical vote-limiting bar 87, which vote limiting bar is attached to the plate B by shouldered screws 92, 93 (similar to the screws 34) passing loosely through the slot 88 in the bar. The said screw nearest the upper end of the said bar is so set as to limit the movement of the bar downwardly, so as to bring the feed dog 85 into contact with the first tooth of its ratchet. In line with the slot 88, I provide the plate B with threaded holes 89, equi-distant with the ratchet teeth on the feed side of the bar, and upon the surface of the bar, at one side of the said slot, I provide numbers from 1 to the capacity of the bar. Said numbers are each opposite one of the threaded holes, No. 1 being distant from the lower end of the slot so far that if the lower screw 92 were placed therein the bar would jam against it upon a very slight movement after one vote had been recorded on any mechanism of the system and prevent any further voting therein. The bar is held step by step, at its upthrust by the spring impelled, angled retaining dog 90 attached to the plate B, and which engages with the ratchet teeth 91 upon the side of the bar. It is the design to place the said lower screw 92, in the hole opposite the number on the bar corresponding to the number of votes authorized to be cast by one voter in the system, the bar being meantime supported on the upper limiting and guiding screw 93. I have represented the said vote limiting screw 92, as opposite the figure 5, and in this case each voter could register five votes in the system, one each for five persons and no more. The relation of keys, locking and interlocking blocks and all other moving parts, is such that when a key is actuated to register a vote, the bar 87 is moved one step and retained by the dog 90 before the lever 22 is moved.

In cases where the limit is a large number of votes, a longer bar may be used, or, if preferred, a ratchet wheel 94 may be substituted therefor as shown in Fig. 30, which wheel may be attached to the plate B in any desired manner and may be provided with the holes 95 and the adjacent numbers from 1 to the capacity of the wheel in the order shown in Fig. 30, one hole and one number being provided for each ratchet tooth. I also provide the retaining dogs 96, also the stop 97, which normally rests against the stand 98, which stand is permanently attached to the plate B and projects over the edge of the wheel beyond the line of holes 95. The spring 99 is also provided for returning the wheel 94 to its normal position when it is released from the detention of the retaining dog 96. The limiting screw 100 is adapted to be placed in one of the holes 95, adjacent to the number corresponding to the number of votes to be cast by one voter in the system. As in the case of the vote-limiting bar, the relation of the parts is such that the wheel 95 is moved one step for each vote registered in the system, and when the prearranged limit has been reached the screw 100 abuts upon the stand 98 and prevents further voting in the system, and each movement of the wheel and its retention precedes the registering of the vote as in the case of the bar.

I provide that unusually limited voters, as women in some States, may vote to their prescribed limit under the same or similar safeguards and restrictions as are afforded to and imposed upon others, as follows: Adjacent to the stop-blocks 33, at one end of the horizontal series or rows of locking blocks 29, preferably those at the side of the casing, containing the entrance door of the compartment A, I place a perforated, vertical flat bar of iron 101, running in bearings 102, attached to the plate B, and normally held by the projection 103 at its head, resting on the bearing 102 nearest to said head. I provide the adjacent locking blocks 29, each with a pin 104 passing loosely through the spring 32 and through the stop block 33, and when actuated by the ballot key, passing loosely also through the perforations 105 Fig. 25 in the bar 101. The said perforations are equi-distant with the said pins 104 upon the locking blocks 29, and all of them with the exception of those adjacent to the series wherein the limited voter is permitted to vote, are but slightly larger than the said pins, but those perforations which are adjacent to the said excepted series are elongated into slots 105'. When a woman or other limited voter is about to enter the compartment A to vote, an attendant charged with that duty depresses a lever 106, which is pivoted to the plate B at 107, and passes through an opening 108 in the side wall. When the said lever is depressed it will raise the vertical rod 101 by means of a pin 109 thereon, working in a slot 110 in the end of the lever, as shown in Fig. 9, and the rod 101 will be caught and held by a spring impelled angle catch 111, which engages with the projection 103 upon its head. The raising of the rod 101 moves the solid portion thereof in front of the said pins 104 on all those series of mechanisms wherein the said limited voter is not permitted to vote, thus preventing the operation of any key therein; but the slots opposite the lines intended to be voted upon by said limited voter are so long that the pins therein are not obstructed and the keys therein may therefore be operated in the normal manner. The same result may be obtained by making the perforations in the bar 101 and dispensing with the pins 104, in those series wherein the said limited voter is permitted to vote.

In Fig. 9, 112 is a plate of sheet iron or other like material one side whereof is preferably blank and the other side may bear the word "Woman" or some other word or words which, when exposed, will indicate that an unusually limited voter is about to occupy or is occupying the compartment A. This plate 112, normally stands in the position indicated by the dotted lines in said figure and the blank side thereof is exposed to view; but when the lever 106 is depressed to raise the rod 101 the said plate is turned by means of the rod 113 attached thereto, and projecting inward and coupled to the lever 106 at 114 by means of the connecting wire 115, so as to expose the side thereof bearing the inscription. At once upon the moving of the said lever and before it has moved far enough to move the rod 101, a gong 116 may be struck by its hammer being connected with the wire 115, thus calling attention to the fact that the said limiting mechanism has been set. To prevent access to the mechanism on the plate B through the opening 108 in the wall, I provide a door 117 to slide vertically in guides, and I pass the lever 106 through a hole in the said door. The said door is projected above and below the lever so far that the slot 108 in which the lever works is at all times covered. This door may be dispensed with if the wire 115 be carried through a diagonal hole in the wall and be attached outside the wall to the lever and the pivot of the lever be located in the wall. The bar 101 is made heavy enough to be retracted by gravity when released, and a rubber or other buffer may be placed in the projection 103 of the head to impinge on its bearing when it drops.

In Fig. 9, a part of the machine is shown with the bar 101, set and on the line of keys marked 119, one vote has been recorded. The bar 101 may be used to prevent the operation of any and all keys in the machine by raising it so far that the slot 105' and the holes 105 are all out of alinement with their adjacent pins 104, and holding it there by any suitable means, as for instance, by means of a second projection on the angled catch 111 coöperating with the head 103 of the bar. If this construction be used a removable stop may be placed in the wall of the compartment below the door 117 to limit the movement of the lever 106 when the voting is in progress. A separate entrance door may be provided for persons of limited franchises and connected with the bar 101 so as to set it when the door is opened to admit such a voter to the compartment A.

Upon the inner side of the frame C, being the side adjacent to the plate B, is placed a vote record receiving medium, which may be in the form of a tally sheet 16, see Figs. 1, 2, 3, 11, 18 and 20 and which is provided with a series of perforations 16' see Figs. 1, 3 and 18 in alinement with and slightly larger than the inner ends of the keys 4, through which perforations 16' the keys 4 may pass when they are pressed in by the voter operating the handle 6. This tally sheet 16 is shown secured to the frame C by spring cotters 17, Fig. 21, each of which is provided with tongues 18, formed by stamping and turning back the central portion to form a hole large enough for the easy passage of the key. The tongues 18 thus formed are passed through the perforations 16' in the tally sheet 16 and into the mouth or opening of the channel bars 3, where they are secured by the recessed portions 19 of the bars 3, the tongues being bent or angled to fit said recesses.

To prevent the sheet 16 being attached in a wrong position I provide along its upper end a row of perforations similar to those described for the passage of the keys but out of alinement with the channel bars, I also provide the upper cross bar of the support with recesses in alinement with said row of perforations and formed to receive the tongues 18 of the cotters 17 and retain them in a manner similar to the channel bars. See top of Fig. 11. When the cotters have been passed through the tally sheet 16 and into the bars the outer ends of heads thereof will hold the tally sheet 16 securely against the bars and other parts of the frame. The said tally sheet may conform in size and form to the requirements of the then ensuing poll, and may be provided with the names of candidates nominated to be voted for and with a suitable legend as "Scattering," upon each series or line of names of candidates for the same office, and with suitable legends to guide the voter in his choice when questions are submitted to be answered by "For" or "Against" or "Yes" or "No," and with a space adjacent to each such name and legend for the reception of the record as elsewhere set forth, and also with certificates to be signed by the judges of election or other authorized persons. The names of the candidates and the legends upon the tally sheets are so arranged that they show through the glass covered spaces 21 in the frame C, each adjacent to one of the key handles 6. The said tally sheet may be also provided with a line or lines of small perforations, as at 20, Fig. 11, or like those in a sheet of postage stamps, to enable the judges of election, at the close of the poll, to conveniently separate it into two or more parts, to the end that they may make returns to the several officers charged by law with receiving and caring for such returns, as for instance to the city clerk, for city offices, and to the county clerk for others. Separate sheets may be used for the different returns but I prefer one sheet, to be divided after the close of the poll. The tally sheet 16 may be especially prepared or manufactured as is the paper for national currency, under such safeguards as the wisdom of the legislatures may suggest. The names of the candidates of each political party may be arranged upon the tally sheet 16 in vertical lines under suitable headings, as Democratic, Republican, etc., and the names of candidates for the same office in horizontal lines. That part of the tally sheet devoted to each party may be tinted with a distinguishing mark or color to guide the illiterate voter.

The counter wheels B', B', B', are of thin flexible material, slitted from the circumference thereof, nearly to the center, forming tongues $b$, $b'$, each of which tongues may be suitably curved and provided on its face with suitable means for evenly impressing, or otherwise forming a number or character upon the tally sheet. These wheels can be loosely mounted upon the face of the plate B or within the recess $b^2$ and they can be provided with the key socket $b^3$ for setting them, and they may be connected together in any usual manner for causing the tens wheel to move one step for each revolution of the units wheel and the hundreds wheel to move one step for each revolution of the tens wheel. A plate $B^2$ of thin material may be made to cover the wheels and it may be provided with the openings $B^3$ through which one tongue of each wheel may be forced against the tally sheet 16. This plate may also be provided with the openings or key holes $B^4$ to permit the use of a key to reset the counter wheels. See Fig. 8. Detent springs $b^4$ are provided designed to insure the correct position of the register wheels at all times. To move the units wheel of the counter one step each time that the key 4 is pushed in, I provide a short lever 22, which projects through the plate B and is pivotally secured thereto and has its end toward the key beveled. See Fig. 7^A. The other end engages with the units wheel of the counter by means of the pawl 23. Inasmuch as the wheels are located in a horizontal plane below the key, it is desirable to bend the beveled end of the lever 22 upward into the path of the key 4 as shown at 24, and also to normally hold it in that path by the spring 25 (Fig. 9) so that when the end of the key is thrust in it will engage with the said beveled portion of the lever 22 that lies in its path, and force it back out of the way, thus swinging the lever 22 upon its pivot and causing the pawl 23 at the other end of the lever 22 to move the units registering wheel one step, It will be seen that the actuation of any key 4 registers a vote without mistake upon the mechanism pertaining to the name or legend to which such key is devoted.

After the poll is closed it is desirable to transfer the registration of votes indicated by the registers to the tally sheet. This may be done manually as by copying the numbers on to the sheet with a pen, but I prefer to do it mechanically by means of a printing mechanism located in the machine, thereby avoiding error and preventing fraud upon the part of the person making the transfer. For this purpose I provide the frame C with the abutments or pads 35', Fig. 4, which may be of slightly yielding material, a pair of pads for each register wheel, which pads may be inked or faced with typewriter ribbon or carbon paper and so formed and located in such position, that when the register wheels are caused to press against the poll sheet and press it against the pads, one number or character upon each wheel and one only will be imprinted upon the front part of the sheet in its appropriate place. The said pads 35' may be attached in any suitable manner to the face of the brackets 35 and the said brackets may be attached in any suitable manner to the channel bars 33 in the frame C. The glass 21 is cut away in such form as to fit a rabbet 35″ in said bracket and the bars and the brackets may be cut away so as to interlock with each other and form a very rigid connection at 35‴.

The numbers or characters are preferably raised upon that surface of the wheel $b'$ adjacent to the sheet 16 either in the form of ordinary type or in such form as to emboss or puncture the character upon, into or through the paper 16 in any usual manner, or the said characters may be punched or cut out of the said sheet 16 as is usual in bank check perforators, in which latter case, in lieu of the pads 35′ above described the usual perforated plates may be used.

A very convenient means for pressing the registers against the sheet is to provide one casing or frame 36 to each set of registers and to loosely mount therein rods or plungers 37, one for each register wheel and each provided with the retracting spring 40 and movable through the hole 37′ in the plate B, also to loosely mount in or upon the said casing a number of longitudinally movable bars 38, preferably arranged horizontally across the plate B so that each bar will engage with an entire row or series of plungers. Upon the side of the bars facing the plate B is secured a series of semi-elliptical springs 39, each of which will engage with one end of a plunger 37, and force its other end against the register wheel $b'$ and cause an impression to be made upon the tally sheet 16. These springs 39 are stiff enough to overcome the resistance of the register wheels $b'$ and to cause the characters on the said wheels to form clear impressions upon the tally sheet 16 in the manner provided, and they may be secured to the bars 38 in any desired manner, as for instance, by slotting their ends and passing screws through the slots into the bars, or the ends of the springs 39, may be passed under suitable clasps or staples attached to the bar.

It is evident from the foregoing that when the bar 38 is moved longitudinally each of the springs 39 will engage with its respective pin or plunger 37, and as the bow of the spring 39 advances it will gradually force the plunger 37 against the register wheel $b'$ and the register wheel $b'$ against the sheet 16 and the sheet 16 against the pads 35′, thus imprinting the proper characters upon the sheet 16. If it be preferred the plungers 37 may be dispensed with and the register wheels $b'$ may be constructed of non-flexible material and the axles thereof be projected as shown at 41, in Fig. 20, so as to be engaged by the springs 39 on the printing bars 38, the retracting springs 42 being made to surround the said axles and to bear upon the plate B and the shoulders 41′ upon the said axles. In this construction it will be seen that the longitudinal movement of the bars 38 will move all of the characters on the wheels $b'$ against the record receiving medium 16, but inasmuch as the pads 35 are located opposite one character only upon each wheel, only one such character from each such wheel $b'$ will be impressed upon the medium 16. The pawl 23 is in this construction provided with an engaging surface so broad that the motion of the wheel in the direction of its axis will not throw the pawl out of contact with the notch or bearing thereon.

The bars 38 may be operated separately in any desired manner, or they may be joined together by means of one or more cross bars 43, and operated simultaneously by means of a lever 44, which is secured to the machine in any manner. In Fig. 9 I have shown the lever 44 pivotally secured to one wall of the chamber A, with its free end projecting through the side of the wall, and the inner end provided with a slotted arm 45, which engages with a pin 46, upon one of the bars which is preferably located substantially midway of top and bottom of the whole. Upon said lever and concentric with its pivot I form or provide a cam or shoulder 47, having upon its periphery the ratchet teeth 48, which coöperates with a spring lock 49, to prevent a retractive motion of the lever until the bolt of said lock is thrown back by any suitable means, but which means forms no part of my invention and therefore is not shown. The said ratchet 48 and lock bolt 49 may be placed and related as to engage just before the support C is dropped as hereinafter set forth for the second or last time, the intention being to thereby prevent a premature retractive movement of the printing bars. Two or more levers 44, may be used and connected together in any desired manner, as for instance, by a connecting rod, so that said levers will be operated in unison.

For the purpose of detecting the fact in case that any of the registers are not set at "0" or zero at the opening of the poll, and of accurately indicating the number of votes actually registered by each mechanism the recording mechanism should be operated after the support C has been secured to the plate B and before the voting begins, and it should be operated again after the poll is closed and before the machine is opened for the removal of the sheet. To prevent the register contacting with the sheet in the same place at both of these times it is necessary intermediate said times, to move the sheet or registers relatively to each other. I prefer to move the sheet and the support to which it is attached, and I prefer to move them vertically, so as to place the successive imprints of each register one above the other, but they may be moved laterally in which case the said successive imprints will be at different points in the same horizontal plane. For the purpose of these two successive impressions, two pads 35' are provided for each wheel. See Fig. 4.

As an illustration of what I mean by the foregoing, I have shown at 50, in Fig. 11, how the sheet will appear when taken from the machine if each of the political parties has nominated the candidates whose names appear thereon, respectively for the three offices named, and in case each candidate has polled 206 votes. If, however, the registers for lieut. governor have been improperly set before the first printing, John Doe's hundreds wheel being set at 1, Adam Strong's tens wheel at 2, and T. D. St. John's hundreds wheel at 9, the resulting imprints will appear as indicated at 51. In each of these three instances of lieutenant governor the difference between the upper and lower figures show the correct number of votes cast for the respective candidates. In the case of St. John it is seen that the wheels have passed 999, therefore the canvassing board will supply the figure 1 in the thousands place, the number in the lower row, or the one first printed being greater than the one in the upper row, or the one last printed.

To accomplish the vertical movement of the support C and the tally-sheet 16 thereto attached, I provide the support C with a hinge which has a long pintle 52, Fig. 5, that projects into a correspondingly deep socket 53, and also with a notched and rigidly attached latch 54, see Fig. 1, which projects into an opening 55, in the plate B, Figs. 9 and 10, and also with a spring dog or catch 56, see Figs. 15 and 16, which project into a hole 57, in plate B, Fig. 16. I also provide under the heel of the support C a cam 58, see Figs. 1 and 26, which is secured to the floor of the compartment as shown in Fig. 1, far enough away from the plate B to permit the support C to drop behind it when fully closed against the plate B. It will be seen that in the above construction, as the support C is being closed back against the plate B it will be lifted by its heel riding the cam 58, which will bring the latch 54 into alinement with the opening 55 in the plate B, and will also bring the spring dog 56 against the face of the plate B just above the opening 57 and force it back into a recess 59, provided in the support C. As soon as the support C is closed against the plate B it will drop as far as the spring dog 56 will permit and as shown in Fig. 10 a beveled shoulder 60 in the nose of the latch 54 will overlap the plate B and draw said plate and the support C as nearly into contact as another shoulder 61, on the latch will permit, even if the plate or support should be slightly bulged or sprung out of true. When the dog 56 enters the hole 57 it will restrain the support C from dropping the full distance that it would otherwise drop, until it is released therefrom. As many of the dogs 56 and latches 54 can be provided as are deemed necessary.

A very effective way of releasing the support C from the restraint of the spring dog 56 and of permitting it to again drop, is to provide one of the printing bars 38 with a trigger 62, which may be in the form of an angle lever and may be pivotally secured to the top of the bar 38. See Figs. 15 and 9. One end 63 of the trigger or angle lever 62 engages with a shoulder 64 on the plate B at the end of a recess therein, and the other end of the angle lever 62 which may be shouldered is caused to pass into the hole 57 far enough to push the catch 56 out therefrom and back into the recess 59, when the first mentioned end 63 engages with the stop 64. These parts are so arranged and related that the trigger 62 will not engage with the spring dog 56 before the springs 39 upon the printing bars 38 have forced the plungers 37 in to the full extent of their movement and have allowed them to retract so that the register wheels b' are out of contact with the sheet 16. When the trigger 62 has released the spring catch 56 the support C and the sheet 16 thereto attached fall down to their lowest limit.

To avoid the possibility of the support C not falling as contemplated upon passing the apex of cam 58, I prefer to cause the upper part of the latch 54 to project into the path of the lower part of one of the printing bars 38 and I bevel the end of the said bar as shown at 65, see Fig. 9. so that when its longitudinal movement begins, if the support C has not fallen as contemplated, the said beveled portion 65 will engage with the latch 54 and force it and the support C down to their proper position before the springs 39 have moved the plungers 37 far enough to make an impression of the sheet 16. As a further precaution the support C may be provided with a lever 66, see Fig. 5, the inner end of which projects into a hole or recess 67 in the plate B. See lower left hand corner of Fig. 9. It will be seen that after the support C has been closed against the plate B and the lever 66 has entered the hole 67 the depression of the long end of the said lever will force the support C downward.

To prevent shock when the support C drops I provide the end of the hinged pintle 52 with a leather washer 68, closely fitting the socket 53 of the hinge, and at the lower end of the latter I provide a small vent 69 through which the air slowly escapes, thus preventing the too sudden dropping of the support. It will be seen that the ballot indicating keys cannot be actuated to register votes on the registering mechanism before the frame C is properly closed against the plate B and dropped to its lowest point, as they are not in alinement with the holes in the plate B before that time. The shoulder 61, upon the latch 54, and the socket 53 of the hinge are so arranged as to hold the support at such a distance from the plate B that the sheet 16 can move down in unison with the support C, without being in actual contact with the parts upon the plate B.

In order to insure the proper location of the printing bars 38 when the support C is closed against the plate B, a heavy guard 70 (Fig. 9) is pivotally secured to the reverse side of the plate B, above the slot 55, and in such position that unless the printing bars 38 are properly located said guard 70 being impelled by gravity and the spring 71 will cover the said slot 55 and prevent the entrance of the latch 54 therethrough. To prevent the pressure of the latch 54, against the guard 70 breaking or bending the latter, a staple or stand 72 is rigidly secured to the plate over the guard and just above the slot 55. One of the printing bars 38 is projected just above the slot 55 and provided with a lug 73, upon its inner surface, which lug engages with a pin 74 upon the guard 70 to swing the lower end of it back from the slot 55 when the printing bars 38 are at the extreme limit of their inthrust or retraction. If the printing bar 38 is not moved back to its full extent, the guard 70 will lie over the slot 55 in the plate and prevent the entrance of the latch 54 as above stated, but when the bar 38 is so moved back the lug 73 will engage with the pin 74 and draw the guard 70 back out of the way so that the latch 54 will pass freely through the slot. When the printing bar 38 is moved to make the first imprint upon the sheet 16, the lug 73 passes away from the pin 74 and lets the guard 55 rest against the side of the latch 54 with the first shoulder 75 thereof, over the top of the latch. As soon, however, as the trigger 62 upon one of the printing bars 38 has disengaged the dog 56, and released the support C from its restrained position and permitted it to fall, the latch 54 will pass downward in the slot 55 and permit the second shoulder 76 of the guard 70 to swing across the slot 55 above the latch 54, thus preventing the return or upward movement of the support C until the guard 70 has been drawn back out of the way, which is only accomplished by the return movement of the printing bars 38 when they are operated to impress upon the sheet 16 the numbers shown by the registers at the close of the poll. A spring 71 may be made to engage with the lower end of the guard 70 and force it to perform its movement as stated.

If it be preferred to inscribe the numbers manually upon the record receiving medium, I would preferably modify the construction of the machine as follows: Referring more particularly to Figs. 17, 18, and 19, I dispense with the frame C and instead of the channel bars in which to place the ballot indicating keys, and their retracting springs, I provide a separate casing 161 for each key and its spring, which casings I attach in any usual manner to bars of wood or iron 162. I provide said bars 162 with holes corresponding to those in the plate B for the passage of the ballot indicating keys and I also provide plates of glass 163, which may be located between said bars 162 and secured in position thereby, one for each ballot key, or one for several keys, as may be preferred, said glass projecting from the bars in the same direction as the handles 6 of the ballot indicating keys. To one of the said bars 162, preferably to the one designed for the right side of the wall B, I also attach, upon the side opposite the glass, the attachment F for voting for persons not nominated. See Figs. 1, 17 and 27. I attach these bars 162 to the plate B by placing their lower ends in sockets 164, and by passing the catches 165 at their upper ends through the holes 166 in the plate B. Intermediate catches can be used if desired. It is evident that when once attached these bars 162 cannot be released from the plate B, except from the rear. Preferably the bar 162 at the right should be first attached and the successive bars to the left may slightly overlap each the adjacent glass upon its right, forming a framing therefor. See Fig. 17. For covering each of the vertical lines of ballot key holes in the plate B, not to be used at any particular election, I provide flat bars of iron 162', see lower left hand corner of Fig. 17, with no openings therein and with no means thereon for operating the registering mechanisms, which flat bars are attached to the plate B, in lieu of, and in a manner similar to, the key bearing bars. The plain bar 162' adjoining the last column of keys at the left is provided with a recess or rabbet which overlaps the adjacent glass to its right and holds it in place. See Figs. 17 and 1. If it be preferred, these bars can be secured or framed together to form a door, as shown for the U shaped channel bars. Before attaching any of the aforesaid bars to the plate B, I attach the vote record receiving medium 16 to the plate B in any desired manner, as by means of the cotters or hollow rivets 17, which have their tongues passed through holes in the medium and into the key openings in the plate B, which may be recessed similar to the channel bars, for retaining the cotters in position. (See Fig. 21.)

Instead of placing the register wheels in a recess or in front of the plate B, they may be placed in the ordinary casings attached to the reverse side of the plate B and be actuated by a slide in the usual manner. I prefer to place the openings 167 in the said casings, one for each wheel, at the lowest point thereof, to the end that the numbers seen through the said openings may be in close proximity to the opening 168 in the plate B, which opening is provided for the purpose of giving access to the reverse side of the record receiving medium for inscribing thereon the numbers seen on the adjacent wheels through the openings 167. If it be preferred, said openings 168 in the plate B may be placed at one side of the register casing but I prefer to place them below. In this construction I dispense with the printing mechanism and its actuating lever, but retain the mechanism described for enabling persons of limited franchise to vote and also that described for voting for two or more candidates for one office, and the key locking and interlocking devices.

The judges of the election need not see the names on the tally sheet when they are inscribing the numbers thereon, and there is no reason why they should know to what names the several numbers relate, for the reason that the said numbers respectively relate to the names on the sheet in the section opposite to the adjacent opening and if the inscriptions are made in the said adjacent openings there can be no mistake; but, for the convenience of the canvassing board, the person preparing the said sheet may place the names and legends upon both sides of the sheet, each name and legend upon one side being opposite the same name or legend upon the other side.

To enable a voter to indicate a choice for a person not named on the tally sheet, usually called a "scattering" vote, upon the support C shown in Figs. 9 and 12, and for each row or series of mechanisms, I provide an attachment F, wherein may be placed material and mechanism similar to any coin controlled vending mechanism designed for vending articles in the form of cards or pieces of paper. The adjacent key 120 (Fig. 1) may be provided with an arm 121 projecting through a slot 122 in the channel bar and into the attachment as shown in Fig. 1, where it may serve in lieu of the usual coin to trip the releasing device of the vending mechanism and thereby enable the voter to obtain a card of piece of paper on which to write or affix the name of the person for whom he chooses to vote for the office to which pertains the attachment from which the paper came. The said cards or paper may bear such marks or legends as the statutes may provide for the prevention of fraud. After having indicated his choice on the card or cards so obtained, the voter can deposit the said cards or pieces of paper in a suitable receptacle therefor or may hand them to the judges of election for such deposit. In Fig. 27 I have shown such a receptacle G, which may be in the form of an ordinary ballot box and is provided with a slot 123, connecting it with the chamber A for the insertion of such cards or pieces of paper. The said receptacle may also be provided with any devices usual in ballot boxes for preventing fraud, and such restrictions may be imposed upon the deposit of the cards or paper and the counting and return of the votes indicated thereon as the wisdom of the legislators may suggest.

When the tally sheet is taken from the machine after the close of the poll it will bear a record of the total number of times that each register devoted to the scattering vote has been actuated. The names of the persons voted for upon the material taken from the said attachments and the number of votes indicated for each such person can be learned by examining the contents of the said receptacle, and the detailed record thereof can be manually added to the tally sheet, either upon the reverse thereof or in spaces provided for that use, upon its face, but the total of such manually added vote should not, and if fraud has not been committed will not, exceed the total impressed in each case by the mechanism.

Provision may be made for the "scattering" vote in any system wherein the voter can vote for two or more persons for the same office by providing as many "scattering" boxes therein as the number of votes that the voter is entitled to record in such system. As a precaution against two or more of such cards or papers being voted by the same voter for one person, provision may be made that each voter shall, before depositing such ballot in the box provided therefor, or otherwise disposing of them, inclose them in an envelop to be provided and used under such restrictions as the statutes may provide. It may also be provided that any vote cast in contravention to the prescribed method shall not be counted but shall be returned as "wasted;" as shall be any "scattering" ballot whatever which bears the name of any candidate named on the tally sheet for the same office.

Although I do not wish to limit myself to any particular form of vending apparatus, I have shown one form thereof, which is constructed as follows: Referring now to Figs. 12, 13, and 14, the channel bar 124, may be made somewhat deeper than the normal depth and is provided with a slot 125, to admit the wheel 126, and the spur pinion 127, as shown, and the ballot key 128, may be formed correspondingly longer and have a greater longitudinal movement and be provided with a retracting spring 129, one end of which is attached to the cap 12, and the other end to the surface of the key, 128. This said key may also be provided with the rack 130, upon one of its sides. The feed wheels 126 and 131, and the spool 132, and the angled lever 133, are journaled vertically within the attachment and the spur pinion 127 is mounted loosely on the journal of the feed wheel 126, and the said wheel and pinion are made to move in unison in one direction, when the key is thrust in, by means of any ordinary mechanism and when the key is retracted the said pinion turns in the reverse direction but does not move the wheel. The said feed wheels 126 and 131, are rough or rubber faced and they are intergeared in any usual manner so as to turn in unison and they are provided with embossing or printing devices 134 and 135, and with cutting devices 136 and 137. 138 is a stud around which to pass the paper 139, which is wound upon the spool 132, and one end of which paper is gripped between the wheels 126 and 131 and the other is attached to the hub of the spool at 140. 141 is a slot in the front wall of the attachment and 142 is a tube or way leading from the said slot to a point as near as practicable to the point of contact of the wheels 126 and 131.

The relation of the parts is such that when the actuating key is thrust in and after, but not before, it has in normal manner moved the register wheel one step, the rack 130 acting upon the pinion 127 will turn it and the wheels 126 and 131, which wheels gripping the paper between them will feed a part of it through the tube 142, out of the slot 141, and the cutters 136 and 137, coming into contact with each other, will cut the strip of paper nearly off. This cut is made diagonally, thus insuring that the grip of the said wheels upon the paper is maintained. To insure that the succeeding piece of paper shall be fed into the tube 142, a small part of said strip at the point where the cutters first contact with it may not be cut, but this part may be so small that when the voter, having access to the other or protruding end, pulls upon the strip of paper it will tear off without moving the wheels 126, 131, one of the said wheels being provided with a friction spring or brake, bearing upon the roof of the apartment and stiff enough to insure such results. The wheels 126, 131, are completely revolved once for each inthrust of the actuating key 120, and each time that they so revolve the embossing devices 134, 135, impress upon the piece of paper fed out and cut off, any character that may be provided upon the said embossing devices, as for instance, the distinguishing member of the mechanism actuated, No. 1 being preferably at the top and the other numbers following in order, thus enabling the judges of the election when counting the "scattering" ballots, to determine which apartment the several pieces of paper were taken from. The said paper may be specially prepared and may bear such marks or legends as will guard against the improper use of any part thereof by any voter and against the use by any voter of any paper in lieu thereof. To guard against any voter actuating any key pertaining to one of these "scattering" mechanisms after the paper therein is exhausted, as might happen in a system wherein one voter is permitted to cast many votes for candidates for one office, as Presidential electors, I provide the hub of the spool 132, with a slot 144, midway thereof see Fig. 13 and I also provide the spring impelled angled lever 133, pivotally attached at 145. So long as one layer of paper remains on the said spool the said slot is covered thereby, but as soon as all of the paper, except enough for one voter, is exhausted, the said slot is uncovered and when the key 120, is retracted, one end 146, of the lever 133, will move into the said slot and such movement will carry the other end 147, of the said lever into the notch 148, in the key and prevent its further actuation. See Fig. 12. The voter who causes this effect will be able to obtain his one piece of paper, but subsequent voters must use some other of the "scattering" mechanisms in the same system. Provision may be made for voting on any question to be answered by "Yes" or "No," or "For" or "Against," or by similar words, by devoting thereto the two mechanisms adjacent to the limiting bar 101, in any series of mechanisms not devoted to other use, or they can be located elsewhere than at the end of the series if the questions be those upon which the unusually limited voter is permitted to vote. The device for voting for persons not nominated can be dispensed with in this case, and its registering mechanism can be one of those used for registering the vote.

For the purpose of releasing the ballot indicating keys and other parts from the detention of the dogs 27 and other devices hereinbefore described, I provide the rockshaft, 149, Fig. 9 attached by brackets 150, at the rear of the plate B. Said shaft is provided with a crank 151, which may be connected with, and operated by, one of the doors of the chamber A, or with and by any suitable mechanism outside the said chamber and accessible to an attendant, as desired. The said shaft is also provided with a series of arms, or extensions, 152, 153, one for each releasing mechanism. One of said arms 152, is connected with the vote limiting mechanism; another 153, with the mechanism for restricting unusually limited voters; and the remainder are connected with the mechanism for releasing the ballot indicating keys 4, and the register actuating levers 22. The vote limiting releasing mechanism consists of a bar 154, one end of which is connected with one arm of the shaft by the pitman 155, and the other end is provided with projections 156, which engage with the heels of the dogs or pawls 85 and 90, respectively, and release said pawls from their respective ratchets and permit the vote limiting bar 87, to drop when the bar 154, is moved longitudinally in its bearings 157. In the mechanism for releasing the bar 101, the heel of the catch 111, may be extended so as to be in direct engagement with the arm 153, on the shaft 149, and be actuated thereby when the shaft and arm are operated.

The mechanism for releasing the ballot indicating keys 4 and the register actuating levers 22 consists in the vertical bars 158, one for each vertical row of keys, see Fig. 9, each connected with its respective arm of the shaft by a pitman 155, and each provided with pins 159, which engage with the latches 27 and 83, and release them from their several engagements when the said bars 159 are moved longitudinally in their bearings 160. From the foregoing it will be seen that when the shaft 149 is rocked by the means provided therefor the several releasing mechanisms will be operated thereby and the parts of the machine will assume their normal positions ready for another voter.

I do not wish to be understood as limiting myself to the particular constructions named, as it is evident that various changes and alterations can be made without departing from the spirit of my invention, as for instance, the ballot indicating key may be operated as shown in Figs. 34 and 35, by an ordinary rack and pinion, in lieu of the handle 6, the rack being upon the key and the pinion, being attached to a shaft projecting through the side of the U bar over the name of the candidate to whom it is devoted, said shaft being provided upon its outer end with a lever for rotating it, or it may have a gib or key upon one side and one portable lever with a key seat therein may then be used for actuating any or all of the said shafts. In this construction one end of the retracting spring 10 may be attached to the surface of the key and the other end to the casing bottom as shown in Fig. 34. A small desk may be provided for each of the compartments A and H, for the use of the voters when preparing "scattering" ballots, which desk may be attached to the wall by hinges so as to fold against it when not in use.

In Fig. 22, I have shown one means for moving the support C horizontally instead of vertically. In the said figure 169 are casters which may be of any usual construction and which sustain the support and facilitate its movement in any direction. 170 are curved stops or straps securely set in the support C and coöperating with the pins 171 which are permanently attached respectively to the ceiling and the floor of the compartment A in front of the plate B and far enough from the adjacent side wall of the compartment to permit of the movement of the support in that direction as hereinafter set forth. The relation of these stops, pins, support and plate, is such that the support C can be swung on the pins 171 and stops 170 as its pivot toward and from the plate B when the said stops and pins are in contact and not at any other time. And said stops 170 and pins 171 are not in contact except when said support C is at the extreme point of its possible movement in the direction opposite to them.

If it be so desired, a separate compartment can be provided for the use of unusually limited voters and the limiting bar 101, and its related devices dispensed with, as for instance, as follows: Referring now more particularly to Fig. 27, H is the separate compartment adjacent to A, and is similarly provided with entrance and exit doors, one of which doors may be in any usual manner connected with the releasing mechanism. 190 is a compartment comprising top, bottom, and inner wall attached to the support C over and upon each of the compartments F, in those series wherein the said limited voter is allowed to vote. 191 is a door in the partition wall between the compartments A and H, normally held closed by any usual door spring and opening into the five sided compartment 190, and forming a sixth side thereto, the whole preventing access through the said door to any part of any mechanism outside of the apartment thus formed. 192 is an extension of the actuating key 120, which extension projects into the said apartment 190, and is accessible from the compartment H, when the door 191 is open. A slot 193 connects the ballot box G with the compartment H. 194 are movable panels forming a section of the partition wall between the compartments A and H, by changing which the compartment may be arranged to be in alinement with the series of keys appertaining to the office of which the limited voter may cast a ballot. When the record receiving medium is prepared for attachment to the support C, as set forth elsewhere, the five sided compartments 190, and the key extensions 192 are attached to the support C upon all those rows or series of mechanisms whereon the unusually limited voters are allowed to vote, and the doors 191 are attached to the partition wall between A and H and adjacent to all such series, and the panels 194 occupy the corresponding space adjacent to all other series of mechanisms. It will be seen that with this construction the said unusually limited voter can be admitted to the compartment H and therefrom have access through the door 191 to the handles 192 upon the keys in the compartments 190, and be able to actuate the mechanisms thereto pertaining and may thereby obtain the cards or pieces of paper upon which to indicate his or her choice, and can deposit the same in the ballot box in similar manner to other voters.

When a large number of candidates are to be voted for, as for instance at a Presidential election in populous States, it may be desired to occupy two or more walls of the compartment A with the mechanisms. This may be accomplished as in Figs. 28, 36, by making the plate B⁵ continuous upon the said sides and around the corners, and by forming the support C' in sections fitting to the several walls and corners of the plate B⁵, said sections may be made to fold back upon each other when swung away from said plate B, as does an ordinary clotheshorse, by providing suitable strong hinges 195, for attaching them together. Each wall may form an entirely independent system, and be provided with each and all of the several mechanisms described by me, each wall having its independent record receiving medium and being devoted to a separate and distinct set of candidates, as for instance, one wall to Presidential electors, one to State officers, and one to municipal, town and county officers, and each section of the support C' may be hinged independently to a post or posts set in the angles of the plate B⁵, in manner similar to that described for a single wall. Two or more walls may be joined in one system, using one record receiving medium suitably formed to fit the faces and corners of the support C', and the several mechanisms upon the said two walls and upon the reverse of B⁵, may be interlocked in every feature, as in the normal construction of the machine, for which purpose the locking blocks 29, and the printing bars 38, and the releasing shaft 149 may be connected at the corner formed by the said walls. In Fig. 36 I have shown the said blocks 29, as projected upon the two walls so as to contact at the corner, where the abutting ends are provided with contacting bevel surfaces 196, 196, which surfaces when one key upon either wall is actuated will operate to prevent the actuation of any other key in the same system upon either wall, and the said printing bars I have shown as connected by a bell crank 197 pivotally attached to and protruding from the wall B and the releasing bars as connected by an ordinary bevel gear 198. It will be seen that two or more walls can be used in the construction described for transferring the registered number of votes manually to the medium, by providing posts or bars to fit the angles at the corners of the plate B⁵ and to be attached thereto by means of the socket and the catch provided for the bars 162. It will also be seen that a many sided compartment may be used and two or more sides connected as above set forth.

In Fig. 29 I have shown how my invention may be adapted to a curved wall. In this construction the vertically moving parts and the recording mechanisms are constructed the same as for a flat wall and the support C, the plate B⁶, and the horizontally moving blocks 199 and printing bars 200 are curved to correspond the one with the others, and the releasing bar 201 is made in short sections, coupled to each other by universal knuckles or joints 202.

In Fig. 33 I have shown a device for beveling the locking blocks in one direction only. 203 are the stops at the end of the series. 204 are the locking blocks between the keys of each series. 205 are the interlocking blocks between two or more series in the systems wherein one person may vote for two or more candidates for the same office. 206 is the bar for limiting the unusually limited voter, having the long slot 207 for those series wherein he or she is permitted to vote and the short notches 208 in all other series. 209 is the engaging end of the vote indicating key. It will be seen that the blocks and other parts constructed as herein shown will perform the functions of corresponding parts elsewhere shown. If it be desired the printing bars 38, the lever 44, the plungers 37, also the guard 70, with their several accessories can be dispensed with, and the flexible tongues of the register wheels can be manually moved into contact with the sheet and made to form the impressions thereon by successively passing a portable punch or plunger through the holes 37' in the plate B, in lieu of the plungers 37 above referred to. Access is had to the said holes by means of the door E. In this construction the restraining dog 56 can be pushed out of the hole 57 by means of the said portable plunger when the time comes to drop the support to its lowest limit. If the rigid wheel with protracted axle 41 be used, the holes 37' can also be dispensed with and the wheels can be contacted with the sheet by a blow upon the said axle as with a mallet.

I claim—

1. In a voting machine, the combination with a plurality of registers or counters embodying printing wheels and a corresponding plurality of ballot indicators for causing the movements of said registers, and interlocking devices between the indicators in the same series, of a support for a ballot sheet, a ballot sheet thereon and means for contacting the entire ballot sheet with all the printing wheels of the registers simultaneously.

2. In a voting machine, the combination with a plurality of registers or counters embodying printing wheels and a corresponding plurality of ballot indicators for separately causing the movement of said printing wheels, and interlocking devices between the indicators in the same series, of a ballot sheet support, and means for contacting the printing wheels and a ballot sheet on the support.

3. In a voting machine, the combination with a plurality of registers or counters each embodying printing wheels, a corresponding plurality of ballot indicators for separately controlling the movement of the printing wheels and interlocking devices between the indicators, of a shiftable ballot sheet support, and locking devices for the sheet support when in one position.

4. In a voting machine, the combination with a plurality of ballot indicators one for each candidate, and one for an irregular indicator, an irregular ballot indicator embodying paper feed mechanism, a corresponding plurality of registers each embodying printing wheels, and interlocking devices between all the indicators to prevent the operation of more than a predetermined number, of a ballot sheet support and means for contacting said sheet with all the printing wheels of the registers.

5. In a voting machine, the combination with mechanisms for registering votes indicated for persons specifically designated adjacent to said mechanisms, of means for indicating the number of votes for unnamed persons for the same office and means for recording the number of votes indicated for each designated person and the number of votes indicated for unnamed persons for the same office.

6. In a voting machine, the combination with registering mechanisms, and indicia adjacent said mechanisms indicating the persons to whom they are devoted, of a delivering mechanism for supplying balloting material, and interlocking mechanism between the delivering and registering mechanism.

7. In a voting machine, the combination with registering mechanisms and a key or plunger for each, of a support adjacent said mechanism adapted to be provided with the names of nominees, an attachment adjacent to the support provided with balloting material and mechanism for providing any voter with material to enable him to cast whatever votes he is entitled to cast, and means for preventing the operation of the key or plunger of the registering mechanism after the balloting material has been exhausted.

8. In a voting machine, the combination, with registering mechanisms and keys for operating them, arranged in a plane, of a support adjacent thereto adapted to be provided with the names of nominees, an attachment adjacent to the support, rollers journaled therein, one of which is provided with a roll of paper, and means for actuating said rollers and feeding a portion of the paper to the voter, and means for preventing the operation of said feeding device when the roll is empty, interlocking devices between the keys for operating the counters and the means for actuating the rollers.

9. In a voting machine, the combination with registering mechanisms and keys for operating them, of a support adjacent thereto, adapted to be provided with the names of nominees, an attachment adjacent to the support, rollers journaled therein, one of which is provided with a roll of paper, means for actuating said rollers and drawing the paper between them, and providing it with characters to indicate where it came from, and means for preventing the operating of the feeding mechanism when the roll is empty, interlocking devices between the keys for operating the counters and the means for actuating the rollers.

10. In a voting machine, the combination, with registering mechanisms, of a support adjacent thereto adapted to be provided with the names of nominees, an attachment adjacent to the support, rollers journaled therein, the shaft of one of which is slotted and provided with a roll of paper, plungers for actuating the registering mechanism and the said rollers and a lever, one end of which rests on the paper and is adapted to enter the slot of the shaft when the paper is exhausted, and the other end is adapted to engage with the plunger and prevent its further operation, interlocking mechanism between the plungers for operating the registering mechanisms and the plunger for operating the rollers.

11. In a voting machine, the combination, with registering mechanisms and plungers for operating them, of a support adjacent thereto adapted to be provided with the names of nominees, an attachment adjacent to the support, rollers journaled in said attachment provided with a roll of paper, a plunger adjacent to the attachment for actuating the registering mechanism, one side of which is provided with teeth for engaging with one of the rollers and means for locking said plunger after the paper has been exhausted from the roller, interlocking mechanism between the plungers for limiting the operation thereof.

12. In a voting machine, the combination of rows of office voting mechanisms, means for locking out a given number of rows of office voting mechanisms, leaving the balance of said rows of mechanisms free for operation, and means operative to restore both the lock out means and the operated voting mechanisms to normal to permit general voting.

13. In a voting machine, the combination of rows of office voting mechanisms, means for locking out a given number of rows of office voting mechanisms, means for controlling said means, the remaining office voting mechanisms being capable of voting operation and means to restore all of said means to normal to permit general voting.

14. In a voting machine, mechanism for voting for candidates for a plurality of offices, means for preventing the operation of voting mechanism for a number of offices less than the whole number to be voted for and means operating as a barrier for restoring the preventing means to normal to permit general voting.

15. In a voting machine, the combination, with registering mechanisms arranged in series, of a series of longitudinally movable blocks for each series of mechanisms, the end block of each of which series of blocks is provided with a pin, a longitudinally movable bar adjacent to the pins, said bar being provided with perforations slightly larger than and normally in alinement with said pins, a portion of said perforations being longer than the others, whereby the pins adjacent said longer perforations may pass through the same at any operative position of the bar.

16. In a voting machine, the combination with a plurality of voting mechanisms arranged in a plurality of series and locking mechanisms therefor, of a manually operated longitudinally movable bar coöperating with certain of said locking devices and controlling their operation when moved to one position.

17. In a voting machine, the combination with a plate having apertures therein, a ballot sheet in rear thereof bearing the names of candidates visible through the plate apertures, of vote registering devices one adjacent each aperture and operable from the front of the plate and means for recording upon the ballot sheet and in proximity to the visible names the totals appearing on the registers devoted to the candidates.

18. In a voting machine, the combination with a plate having apertures therein, a ballot sheet in rear of the plate bearing the names of candidates visible through said apertures, of a printing register for each name appearing through the apertures, means for controlling the registers from the front of the plate and means for recording the total registration of each register on the ballot sheet.

19. In a voting machine, the combination with a plate having apertures therein, a ballot sheet in rear of the plate having thereon candidates' names visible through the apertures, of a printing register adjacent to each aperture, separate operating devices for the registers actuated from the front of the plate, and means for contacting the registers and ballot sheet to print the totals of the registers thereon.

20. In a voting machine, the combination with a support adapted to receive a ballot sheet, a plurality of ballot indicators arranged in front of said ballot sheet, and a corresponding plurality of registers separately controlled by their indicators arranged in rear of the ballot sheet and in proximity to the latter so that the totals appearing on the registers may be transferred to the back of the sheet.

21. In a voting machine, the combination with a support and a ballot sheet, of ballot indicating devices arranged in front of said sheet, registers controlled by said ballot indicating devices and arranged in rear of said sheet and in proximity thereto to enable the totals of the registers to be transferred to the rear of the sheet.

22. In a voting machine, the combination, with a support adapted to receive a perforated sheet, registering mechanisms at the rear of the sheet, spring actuated keys in front of the sheet for operating the registering mechanisms through the apertures in the sheet, a pad for each register wheel of the registering mechanisms, and means for forcing the sheet in contact with the pads.

23. In a voting machine, the combination, with registering mechanisms arranged in a plane, of a support adjacent thereto and movable in a plane parallel with the plane of said mechanisms, said support being provided with means for receiving a record receiving medium.

24. In a voting machine, the combination, with a plate, of registering mechanisms arranged thereon in series, an operating lever for each mechanism, one end of which lever projects through the plate, locking blocks for each series of mechanisms, said blocks being located between the plate and the other end of the lever, and a key for separating the blocks and afterward engaging with the end of the lever.

25. In a voting machine, the combination with a support provided with channel bars and adapted to hold a perforated sheet, of registering mechanisms at the rear of the sheet, keys in each of said bars, each key being adapted to pass through a perforation in the sheet and to actuate a registering mechanism, and means for indicating upon the sheet the total registration shown by the registers.

26. In a voting machine, the combination, with a support provided with channel bars 3, each of which is provided with a series of cut away portions 11 and a slot 7 on one side of the bar extending from the bottom of each cut away portion, keys in the bars, one at each cut away portion, having a handle projecting through the slot and registering mechanisms, one for each key.

27. In a voting machine, the combination with a key casing having a chamber at its end with a reduced passage leading therefrom, of a spring retracted ballot indicating key adapted to enter the chamber and a packing washer with which said key end cooperates.

28. In a voting machine, the combination, with a support provided with channel bars, each of which is provided with a series of cutaway portions and a slot in one side of the bar extending from the bottom of each cut away portion, a cap over each cut away portion having an aperture in its inner wall and an air vent in its outer wall, and keys in the bars, one for each cut away portion, the outer end of which key is adapted to enter the cap through the aperture and be cushioned therein, and a registering mechanism for each key.

29. In a voting machine, the combination, with a support provided with channel bars, each of which is provided with a series of slots on one side and recesses upon the opposite side, guides attached inside the bars in alinement with the slots and recesses, keys in the bars, one for each slot, the inner end of which keys fits within the guides and the other end is provided with a handle on one side which projects through the slot and with a projection upon the opposite side which fits in the recess, a retracting spring for each key, one end of which engages with the guides and the other end engages with the handle and the projection, and a registering mechanism for each key adapted to be actuated thereby.

30. In a voting machine, the combination, with a support, channel bars thereon, each of which is provided with a series of register actuating keys and has a recessed portion adjacent to each side of each key, said support being adapted to hold a perforated sheet, spring cotters, the tongues of which pass through said perforations in the sheet and enter the recessed portions of the bars, and a registering mechanism for each key.

31. In a voting machine, the combination with a series of printing registers and means for operating them, and interlocking devices between the operating means, of a ballot sheet support, a ballot sheet having thereon the names of the candidates and means for operating the sheet support and registers relatively to cause the totals of the registers to be printed thereon in juxtaposition with the names.

32. In a voting machine, the combination, with a plate, of a series of registering mechanisms thereon, means for supporting a sheet adjacent to the registers, a portion only of each register being adapted to be moved toward and from the sheet, and means for moving said portions whereby only the total registration indicated by the registers may be shown upon the sheet.

33. In a voting machine, the combination, with a plate, of registering mechanisms arranged thereon in series, means for supporting a sheet adjacent to said mechanisms, a plunger for each wheel of each register, and a longitudinally movable bar for each series of mechanisms, said bar being provided with means for engaging with the plungers.

34. In a voting machine, the combination with a plate of registering mechanisms thereon, each mechanism consisting of a series of thin slotted wheels, of flexible material provided with indicating characters, a support adjacent said plate, means for holding a perforated sheet between the plate and the support, an ink pad on the support, and means for forcing one of the flexible portions of each register wheel and the pads into engagement with the sheet whereby the character upon said flexible portion is impressed on the sheet.

35. In a voting machine, the combination with a plate of registering mechanisms arranged thereon in series, a casing over each mechanism, spring actuated plungers in each of said casings, one for each register wheel, a longitudinally movable bar for each series of mechanisms, springs upon the bar, one for each plunger and adapted to be forced into engagement therewith by the movement of said bar.

36. In a voting machine, the combination with a plate of printing registering mechanisms arranged thereon in series adapted to be operated relative to a printing surface to print thereon, an actuating bar for each series, and means for connecting said bars together and operating them in unison to printing position.

37. In a voting machine, the combination with a plate of registering mechanisms arranged thereon in series, a support adjacent the plate provided with bars, brackets secured to said bars, one for each registering mechanism, ink pads in said brackets, means for supporting a sheet between the plate and the support, and means for forcing the registering mechanisms into engagement with the sheet and the sheet into engagement with the pads, whereby the characters upon the mechanisms are impressed upon the sheet.

38. In a voting machine, the combination with a plate of registering mechanisms arranged thereon, a support adjacent to the plate and movable toward and from the same and adapted to be provided with a sheet, and means for simultaneously moving the registers into contact with the sheet, whereby the registration of each of the registers is indicated upon the sheet.

39. In a voting machine, the combination with a plate of registering mechanisms arranged thereon, a support adjacent the plate and movable in a plane parallel therewith, said support being adapted to be provided with a sheet, and means for moving the registers into contact with the sheet before and after the movement of the support, whereby each register contacts with the sheet in two places.

40. In a voting machine, the combination with a plate of registering mechanisms arranged thereon, a vertically movable support adjacent to the plate adapted to be provided with a sheet, and means for moving the registers into contact with the sheet before and after the movement of the support, whereby each register contacts with the sheet in two places one above the other.

41. In a voting machine, the combination with a plate of registering mechanisms arranged thereon, a vertically movable support adjacent to the plate adapted to be provided with a sheet, a deep socketed hinge at one side of the support and a shouldered latch elsewhere thereon, said latch being adapted to pass through the plate and engage therewith, and means for moving the registers into contact with the sheet before and after the vertical movement of the support.

42. In a voting machine, the combination with a perforated plate, of registering mechanisms arranged thereon, a movable support adjacent to the plate adapted to be provided with a sheet, means for holding said support at a point intermediate the limit of its movement, and means for moving the registers into contact with the sheet while it is so held, and also after it has reached the limit of its movement, after being released from said restraint.

43. In a voting machine, the combination with a perforated plate of registering mechanisms arranged thereon, a movable support adjacent to the plate adapted to be provided with a sheet, a spring catch on the support adapted to pass into one of the perforations of the plate and hold the support at a point intermediate the limit of its movement, longitudinally movable bars for forcing the registers into engagement with the sheet, one of which bars is provided with a trigger for engaging with the catch and forcing it out of the perforation in the plate after the registers have contacted with the sheet.

44. In a voting machine, the combination with a plate of registering mechanisms thereon, a support adjacent to said plate adapted to be provided with a sheet, longitudinally movable bars for forcing said registers into engagement with the sheet, and means for preventing the retrograde movement of said bars after they have been moved far enough to make the registers contact with the sheet.

45. In a voting machine, the combination with a perforated plate of registering mechanisms arranged thereon, a vertically movable support adjacent to the plate adapted to be provided with a sheet, said support being provided with a spring catch and a shouldered latch for engaging with the plate, an inclined web under the support for raising it, and means for forcing the mechanisms against the sheet.

46. In a voting machine, the combination with registering mechanisms arranged in series, of a series of locking blocks for each series of mechanisms, and interlocking blocks arranged at right angles to the series of locking blocks, and means for preventing the operation of the interlocking blocks after any predetermined number of mechanisms have been operated.

47. In a voting machine, the combination with a plate of registering mechanisms arranged thereon in series, of a series of locking blocks for each series of mechanisms, a series of interlocking blocks adapted to be intersected and operated by any series of the locking blocks, a longitudinally movable bar adjacent to the interlocking blocks, and means for limiting the movement of said bar.

48. In a voting machine, the combination with a plate of registering mechanisms arranged thereon in series, a series of locking blocks for each series of mechanisms, a series of interlocking blocks adjacent to and adapted to be operated by any series of the locking blocks, a slotted ratchet bar adjacent to the interlocking blocks, pawls upon one of the interlocking blocks for engaging with the bar, and a stop for limiting the movement of the bar when any of the registers have been operated a predetermined number of times.

49. In a voting machine, the combination with a plate of registering mechanisms arranged thereon in series, a series of locking blocks for each series of mechanisms, a series of interlocking blocks adjacent to and adapted to be operated by any series of locking blocks, a vertically movable ratchet bar adjacent to the interlocking blocks, pawls upon one of the interlocking blocks for moving the bar upward, a stop for limiting said movement, and a tripping device for releasing the bar from the pawls and permitting it to fall.

50. In a voting machine, the combination with a plate of registering mechanisms arranged thereon in series, a series of locking blocks for each series of mechanisms, the end block of each of which series is beveled at its outer end, a series of interlocking blocks adjacent to the said end blocks, the abutting ends of which interlocking blocks are rounded and normally in alinement with the series of locking blocks, and means for preventing the operation of the interlocking blocks after the registers have been operated a predetermined number of times.

51. In a voting machine, the combination with a plate of registering mechanisms arranged thereon in series, a series of locking blocks for each series of mechanisms, a series of interlocking blocks adjacent to the series of locking blocks, the end blocks of said locking and interlocking blocks being slotted, a screw through each end of each slot and so arranged relative thereto as to limit the movement of the block in each direction, and means for returning the blocks to their normal position and for preventing the operation of the interlocking blocks after the registering mechanisms have been operated a predetermined number of times.

52. In a voting machine, the combination with registering mechanisms arranged in series, a series of longitudinally movable locking blocks for each series of mechanisms, keys for separating the blocks, interlocking blocks adjacent to one end of two or more series of blocks arranged at right angles thereto and adapted to be operated thereby, stops to limit the retractive movement of the interlocking blocks and springs to return them to their normal position when the keys are retracted.

53. In a voting machine, the combination with a ballot sheet supporting plate having an aperture therein, and a ballot sheet located in front thereof, of a registering mechanism located in rear of the plate and in proximity to said aperture whereby the total of the register may be transferred upon the rear of the ballot sheet.

54. In a voting machine, the combination with a plurality of series of ballot indicators, of a series of movable blocks arranged between the indicators of each series for preventing the simultaneous operation of more than one indicator in a series, an interlocking device between the blocks of each series whereby several of the ballot indicators may be operated but a simultaneous operation of more than a single indicator in all the series is prevented, substantially as set forth.

55. In a voting machine, the combination of a series of printing registers, means for actuating said registers independently, and interlocking devices between them, with a platen, and means for contacting all of said registers and said platen at one operation.

56. In a voting machine, the combination of a series of printing registers, means for actuating said registers, a platen, means for contacting all of said registers and said platen at one operation and means for shifting said platen so that records taken at different times may appear in different places of the tally sheet.

57. In a voting machine, two or more series of registering keys in different rows, means to prevent simultaneous operation of any two or more keys in the same or different series, and a single grouping device and means to connect the same with and to be operated by the keys of either one of the plurality of series to limit the total number of keys operated by any single voter.

58. In a voting machine, the combination with a series of movable parts having cams thereon, and tally-mechanisms for respective actuation by said parts, of a series of alined relatively movable main locking members terminally separable by said cams, a cam for each series of main locking members operated thereby, and a series of secondary locking members terminally separable by said last named cams, substantially as specified.

59. In a voting machine, the combination with series of movable parts having cams thereon, and tally mechanisms for respective actuation thereby, of series of alined relatively movable main locking members terminally separable by said cams and limited in movement to the width of one of the cams, and a series of secondary locking members disposed transversely to the main locking members and terminally separable by cams actuated by the main locking members, substantially as specified.

60. In a voting machine, the combination with series of movable parts having cams thereon, and tally mechanisms for respective actuation thereby, of series of alined longitudinally and relatively movable main locking members terminally separable by said cams and limited in movement to the width of one of the cams, and a series of secondary locking members disposed for movement transverse to the main locking members and terminally separable by cams actuated by the main locking members, and limited in movement to the width of one of said actuating cams, substantially as specified.

61. In a voting machine, the combination with series of movable parts having cams thereon, and tally mechanisms for respective actuation thereby, of series of longitudinally and relatively movable main locking members terminally separable by said cams, and a series of relatively movable locking members disposed for movement in a direction transverse to the main locking members and terminally separable by cams actuated by the main locking members, and limited in movement to the width of one said bolt-actuated cams, substantially as specified.

62. The combination in a voting machine of a plurality of series of ballot indicating devices in different rows, interlocking mechanism for preventing the simultaneous operation of more than a single indicator in all the series and means for limiting the total number of indicators operable by a single voter in the said rows of keys collectively.

63. The combination in a voting machine of a series of indicators arranged in any plurality of parallel rows in single candidate groups, a counter for each indicator, an independently movable bar placed transversely to said rows of indicators, means placed between said indicators and said bar whereby any indicator will cause a movement of said bar, said means operating to simultaneously lock all the other series of indicators during the movement of the bar.

64. The combination in a voting machine of a plurality of counters each having a series of type wheels, voting devices for actuating said counters, and interlocking devices between them, a record sheet to receive thereon the indication of said counters, means for contacting a plurality of counters with said record sheet to record the indication of the counters.

65. The combination in a voting machine of a series of registers embodying type wheels, actuating devices for operating them and interlocking devices between them, a record sheet to receive thereon the indication of said type wheels, means for simultaneously contacting all of said register wheels with said record sheet to record the indication of the counters.

66. In a voting machine, two or more tiers or rows of voting mechanisms, one tier for each office in combination with a limiting device for each row, each row with its limiting mechanism constituting a single candidate group and a device common to the limiting devices of all the rows for locking out selected ones thereof to adapt the machine for different voters.

67. In a voting machine, the combination of two or more rows of voting mechanisms each provided with a limiting mechanism to regulate the use of its voting mechanisms, a bar or member adapted for movement to alternately lock or unlock all parts of said limiting mechanisms, means for operating said bar and said voting mechanisms being operable only when respective limiting mechanisms are disengaged from said bar.

68. In a voting machine, the combination with a plurality of series of voting mechanisms, each series being devoted to an office, a member coöperating with certain of the series of voting mechanisms when moved to one position to prevent their operation, mechanism to indicate to others than the voter when said member is moved to locking position and means for restoring said member and the voting mechanisms to normal position after the operation of the registering mechanisms.

69. In a voting machine, the combination with ballot indicators and registers controlled thereby, of a delivering mechanism embodying a movable part interlocked with the ballot indicators to prevent the operation of more than a predetermined number and a register controlled thereby.

70. In a voting machine, the combination with a row of independently operative keys, of means operable by any key of a row for locking all the other keys thereof in their normal position, and means permanently a portion of the machine and operative by an election officer independently of the keys for selectively locking all the keys of any desired combination of rows in their normal position.

71. In a voting machine, the combination with the ballot indicators, means operable by an election officer for preventing the movement of selected ones only of said indicators to voted position, of a barrier and connections between said barrier and preventing means for removing the latter and permitting the operation of the indicator after each movement of the barrier.

72. In a voting machine, the combination with limited franchise voting mechanism operable by an election officer, a barrier controlling access thereto and connections between said barrier and the mechanism for restoring the former to normal position after each actuation of the latter.

73. In a voting machine comprising a number of tiers of voting mechanisms and associated devices, including a limiting mechanism in each tier movable with the voting devices thereof and a notched locking bar common to all of said tiers and operable by an election officer, whereby all of said limiting mechanisms may be locked and alone secure the voting mechanism against operation.

In testimony whereof, I affix my signature, in presence of two witnesses.

JOHN E. RANSOM.

Witnesses:
J. P. Drake,
H. D. Folansbee.